(12) United States Patent
Miah et al.

(10) Patent No.: US 10,534,749 B1
(45) Date of Patent: *Jan. 14, 2020

(54) BLOCK DEVICE EMULATION FOR DATA SNAPSHOTS

(71) Applicant: Amazon Technologies, Inc., Seattle, WA (US)

(72) Inventors: Mahmood Miah, Seattle, WA (US); Matthew James Eddey, Seattle, WA (US); John Sandeep Yuhan, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 803 days.

This patent is subject to a terminal disclaimer.

(21) Appl. No.: 15/087,335

(22) Filed: Mar. 31, 2016

(51) Int. Cl.
  *G06F 16/11* (2019.01)

(52) U.S. Cl.
  CPC .................. *G06F 16/128* (2019.01)

(58) Field of Classification Search
  CPC ............................................ G06F 17/30088
  See application file for complete search history.

(56) References Cited

U.S. PATENT DOCUMENTS

| | | | |
|---|---|---|---|
| 7,636,814 B1 | 12/2009 | Karr et al. | |
| 8,832,026 B1 * | 9/2014 | Kazar | G06F 17/30088 707/634 |
| 9,547,655 B1 * | 1/2017 | Wang | G06F 17/30088 |
| 9,569,446 B1 | 2/2017 | Feathergill et al. | |
| 9,959,278 B1 * | 5/2018 | Khanduja | G06F 17/30088 |
| 10,019,180 B1 * | 7/2018 | Miah | G06F 3/0619 |
| 10,289,493 B1 * | 5/2019 | Miah | G06F 11/1451 |
| 2010/0153617 A1 | 6/2010 | Miroshnichenko et al. | |
| 2011/0047169 A1 | 2/2011 | Leighton et al. | |
| 2011/0131184 A1 | 6/2011 | Kirshenbaum | |
| 2013/0275695 A1 | 10/2013 | Ponsford et al. | |

(Continued)

OTHER PUBLICATIONS

Zhang, Wei, Hong Tang, Hao Jiang, Tao Yang, Xiaogang Li, and Yue Zeng. "Multi-level selective deduplication for vm snapshots in cloud storage." In Cloud Computing (CLOUD), 2012 IEEE 5th International Conference on, pp. 550-557. IEEE, 2012. (Year: 2012).*

*Primary Examiner* — Jesse P Frumkin
(74) *Attorney, Agent, or Firm* — Davis Wright Tremaine LLP

(57) ABSTRACT

A snapshot analysis system analyzes a plurality of data snapshots taken in connection with data stored on a block device allocated by a data storage system. The snapshot analysis system may include an ingestor capable of initially detecting new snapshots and adding a root node for the snapshots. The system may include a block device analyzer that analyzes each snapshot to determine its contents, the relationship within data structures extant within the snapshot, and the snapshot's relationship to other snapshots and/or that of other block devices. The system may also include a clustering analyzer capable of determining whether snapshots are associated with multipart block devices, such as LVM or MD-RAID devices. The system may further include a block device emulator that exposes data associated with a given snapshot as an addressable block device without necessitating retrieval or exposure of the full block device to which the snapshot is associated.

20 Claims, 12 Drawing Sheets

(56) References Cited

U.S. PATENT DOCUMENTS

| | | | |
|---|---|---|---|
| 2014/0032498 A1* | 1/2014 | Lalonde | G06F 11/1451 |
| | | | 707/639 |
| 2014/0258595 A1 | 9/2014 | Venkatesha et al. | |
| 2015/0370502 A1 | 12/2015 | Aron et al. | |
| 2017/0052717 A1* | 2/2017 | Rawat | G06F 3/067 |
| 2017/0230459 A1* | 8/2017 | Lin | H04L 69/04 |

* cited by examiner

BLOCK DEVICE EMULATION FOR DATA SNAPSHOTS

CROSS REFERENCE TO RELATED APPLICATIONS

This application incorporates by reference for all purposes the full disclosure of co-pending U.S. patent application Ser. No. 15/087,334, filed Mar. 31, 2016, entitled "DATA SNAPSHOT ANALYSIS SYSTEMS AND TECHNIQUES," co-pending U.S. patent application Ser. No. 15/087,710, filed Mar. 31, 2016, entitled "SNAPSHOT CLUSTERING TECHNIQUES FOR MULTIPART VOLUMES," and co-pending U.S. patent application Ser. No. 15/087,463, filed Mar. 31, 2016, entitled "SNAPSHOT DATA OPERATION REQUEST PROCESSING."

BACKGROUND

Organizations concerned about mitigating the risk of data loss often back up electronic data as a hedge against data loss or corruption. That is, in an event where data is lost, corrupted, overwritten, or erased, then the data may be restored or the data may be rolled back to a known good state from a stored backup. In addition, some organizations back up data to comply with regulations that require retention of some types of data for a certain amount of time. In order to save time and storage, a full backup may be made periodically with incremental backups performed thereafter. However, in computing environments where full backups are infrequent or where incremental backups are frequently performed, the number of backups to maintain and the storage space required to maintain them can become quite large. Furthermore, restoring data and/or rolling data back to a previous state in such environments can require traversing a large number of these backups sequentially, which can be very time-consuming.

BRIEF DESCRIPTION OF THE DRAWINGS

Various techniques will be described with reference to the drawings, in which.

DETAILED DESCRIPTION

Figure 1:
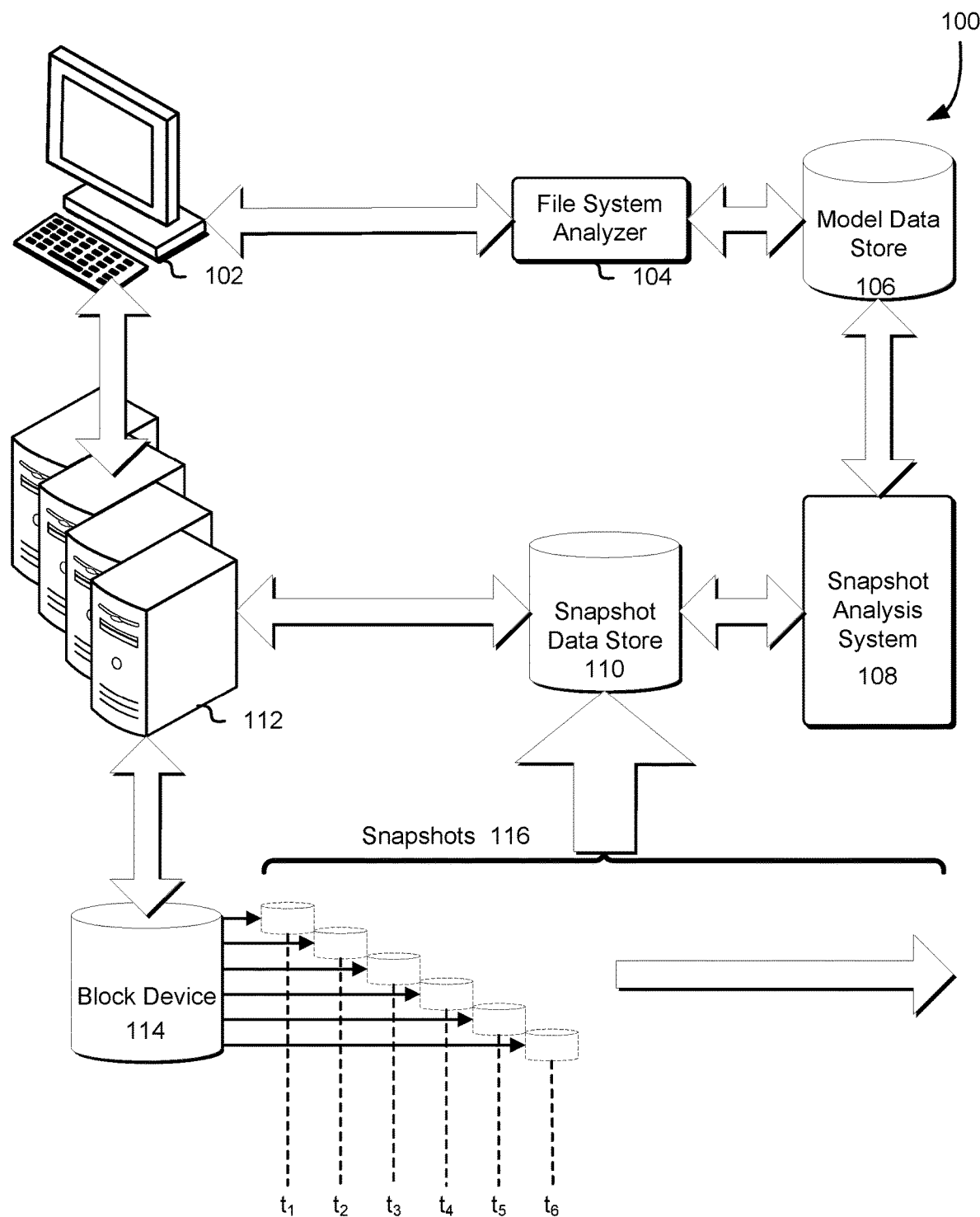
FIG. 1 illustrates an example environment in which snapshots of data stored in one or more block devices may be analyzed, modeled, and/or manipulated in accordance with some embodiments.

In one example, a backup, or snapshot, analysis system is implemented to analyze and model snapshots associated with block devices implemented by a block level data storage service or other data storage system. In some embodiments, the block devices are provided to users of a distributed computing resource provider, and in some of such embodiments, the block devices are exposed to virtual computing instances, which are capable of using such devices as if they are local block devices (e.g., physical disk drives and the like). Some or all of the functionality provided by the snapshot analysis system may initially be agnostic to the contents of the block devices it analyzes. For example, the capabilities of the snapshot analysis system may be provided for block devices regardless of the data, file system type, partitioning, logical clustering, or the like, extant on the block devices. In some embodiments, the snapshot analysis system generates structured information (e.g., metadata) about the block devices regardless of the structured (or unstructured) nature of the data contained therein.

The snapshot analysis system may implement workflows for generating models of snapshots generated in connection with operation of the associated block devices. Such models may include trees, directed graphs, or other similar constructs that describe the relationship between snapshots, block devices, data structures with the snapshots and/or block devices, and other information, that allows for a given data structure described within the model to be efficiently located. Similarly, other elements, such as other data structures, snapshots, block devices, and the like, related to the data structure being searched, may also be efficiently determined, and such structured information is usable to efficiently enable several other capabilities described in this disclosure.

The snapshot analysis system may include several components. For example, the snapshot analysis system may include an ingestor, a block device analyzer, a clustering analyzer, and a block device emulator. Such components may be used to generate snapshot models and expose specific snapshots (or sets of snapshots) in a fashion that is familiar to, e.g., an operating system or virtual computing instance, that may not necessarily be adapted specifically to locate data within snapshots.

To build the models, an ingestor may initially process snapshot information to place root nodes for each snapshot into a model data store. As described in further detail below, each snapshot may, after analysis, be addressable (through block device emulation) as an individual block device, and as such, the root node may correspond to that of a snapshot block device for the snapshot as a whole. Such ingestion may be synchronous relative to the creation of the snapshot by the entity implementing the block device to which it pertains, or, in some embodiments, may be asynchronous relative to such creation.

Synchronously or asynchronously relative to the placement of the root node for each snapshot within the model data store, a block device analyzer builds models of each snapshot starting from the root node representing the snapshot. As the block devices themselves may contain arbitrary data, which may be structured, unstructured, or some combination thereof, the snapshots derived therefrom may also contain such arbitrary data. The block device analyzer loads the snapshot data, such as by use of a snapshot block device emulator, and traverses the contents of the snapshot to determine the contents and organization of the data contained within.

For example, the block device analyzer may have access to a known set of information from which it may draw inferences or direct conclusions regarding the contents of the snapshots it analyzes. In varying stages of the block device analyzer's analysis, it may look at specific locations (e.g., offsets) within the snapshot block device to determine whether, e.g., header and/or trailer data exists, and the existence of such data at those locations may cause the block device analyzer to determine that the data within the snapshot block device is of a certain type. Additionally, such specific locations may include other data that points to the organization and/or relationship between data structures within the snapshot block device, and with such further information, the block device analyzer may make additional reads of other specific locations and subsequent determinations.

The analysis process may, in some cases, proceed iteratively until either the entire snapshot block device has been scanned, or if a specific type (or multiple types) of data structure has been located. As the analysis process proceeds, the models stored in the model data store are updated to reflect the relationships between the types of data structures found, the block device(s) to which they are associated, the time at which they were initially captured, and the like. The models are configured to be traversable by a requesting entity. The models, as mentioned, may in some cases be in the form of directed acyclic graphs, with edges denoting associations between data structures (either within the same snapshot or to other snapshots of the same block device), and vertices denoting the data structures themselves (or versions thereof).

The models may be further influenced by analysis of the snapshots by a clustering analyzer, which may be part of the block device analyzer in some implementations. The clustering analyzer may, similarly to the block device analyzer, search for known signatures at specific locations or by scanning (e.g., linearly) some or all of the snapshot block device (e.g., using a block device emulator), so as to determine whether the snapshot is of a block device that is a constituent of a multipart block device.

As may be contemplated, in implementations where a block device is snapshotted at a certain interval at an individual level regardless of its association with other block devices in a multipart block device, a "cloud" of snapshots may be generated where it may be difficult to separate a snapshot of a given constituent block device with a different snapshot of the same constituent block device. Accordingly, loading snapshots of inconsistent versions of constituent block devices of a multipart block device (e.g., of a LVM logical volume spanning multiple block devices, or an MD-RAID block device that consists of multiple individual block devices) may have unintended consequences, such as corruption of the data contained within the mismatched multipart block device, inability to access or mount the multipart block device, and/or inconsistent versions of data once the multipart block device is mounted.

To avoid such issues, the clustering analyzer may be implemented to determine, deterministically, heuristically, stochastically, or otherwise, whether individual snapshots are associated with block devices that stand alone or are constituent block devices of a multipart block device, and in the case that they are likely constituent block devices, whether the snapshots associated therewith are from the same "version" of the overall multipart block device (even if the clustering analyzer has no prior specific knowledge of the configuration of the multipart block device in question). The clustering analyzer may use machine learning techniques to iteratively improve its accuracy over time.

In some cases, the clustering analyzer may use a signature scanning algorithm to compare header, trailer, or other data, against specific patterns associated with different types of multipart volumes/block devices. Such information may be used as an initial stage to deterministically filter a large "cloud" of snapshots into those that are associated with a given multipart block device and those which are not, thereby reducing the uncertainty and load when performing the second portion of the clustering analysis.

For the second analysis, the clustering analyzer may implement a nearest neighbor search, a k-nearest neighbor search, a Bayesian network, heuristic analysis, frequentist analysis, or other types of cluster analysis techniques to determine likely clusters from among, e.g., different snapshot versions of the respective constituent block devices. In implementations where the clustering analyzer does not use a deterministic approach at this stage, different probabilistic approaches may be implemented in parallel, and a meta-analysis of the outcomes of the different probabilistic approaches may be performed to determine the snapshot/block device cluster combinations that are most likely to be correct. As previously mentioned, machine learning techniques, such as supervised learning with previous results (and the accuracy/correctness thereof) as ongoing inputs, may be used to improve the probability of correct clustering, as well as the identification of more/less effective algorithms/models used in the analyses, over time and/or iteration.

The snapshot models generated by the ingestor, block device analyzer, and clustering analyzer may, as mentioned, be stored in the model data store, and the information stored therein may enable a computing resource service provider to provide a service that processes data operations related to one or more of the snapshots without retrieving the entire block device to which it pertains. Instead, the implemented system may utilize a snapshot block device emulator that exposes only the data (e.g., the differential data) within the snapshots applicable to an incoming data operation request.

The snapshot block device emulator may interface with a snapshot data store to locate the specific "chunk" or "chunks" of data associated with the snapshot. The emulator retrieves the chunks from the location at which they are stored and, depending on the specific data operations requested, places some or all of the retrieved data chunks in a memory cache. The retrieved data is presented as an addressable snapshot block device via a block device driver. The emulator may retrieve the model for the snapshot(s) to determine one or more file systems associated with the snapshot, and in accordance, may configure the appropriate file system driver(s) and present the snapshot block device as a file system device. Depending on the requested data operation, the file system device and/or the snapshot block device may be provided directly to the requestor, or another entity (such as a file system analyzer) may interact via the emulated snapshot block device and/or the file system device to perform the data operations requested (e.g., retrieval of specific files, differential comparisons of portions of snapshots, generation of metadata of the captured snapshots, etc.).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment in which snapshots of data stored in one or more block devices may be analyzed, modeled, and/or manipulated in accordance with some embodiments.

As illustrated, the example environment may include one or more client devices 102 connecting to one or more systems 112 of a computing resource service provider (which may be a distributed computing resource provider), such as over a network. The system 112 may implement, or be attached to, one or more volumes 114, which may be volumes of block-level storage (also referred to as a "block device") provided by, e.g., a block-level data storage service provided by the system or another entity of the computing resource service provider.

As discussed in further detail below, the client device 102 may be any appropriate device operable to send and/or receive requests, messages, or information over an appropriate network and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. The system 112 may be a data storage system, such as a data storage system of a computing resource service provider as described in further detail below (e.g., in connection with FIG. 11), and, as mentioned, may provide a block-level data storage service that creates, defines, or otherwise allocates a block device 114. The block device 114 may, as mentioned, be logical in nature, and may be provided, allocated, or exposed by a different system than the system 112 with which the client device 102 interacts. For example, and as described in further detail below, the client device 102 may allocate a virtual machine instance provided by one or more services of the system 112, which in turn may request the allocation of a block device 114 from a different system. As a further example, the block device 114 may be allocated by and administered by a different system than the system on which the data associated with the block device 114 is stored.

As noted, the present disclosure describes a system for analyzing and modeling snapshots associated with network-attached volumes, such as network-attached block devices 114 and databases. In some examples, a block device 114 may be a logical storage space within (or allocated by) a data storage system in which data objects may be stored in either structured or unstructured (raw) form. The block device 114 may be identified by a volume identifier. Data for the block device 114 may reside in one physical storage device (e.g., a hard disk) or span across multiple storage devices, which, as previously described, may reside on a different system than that of the allocated block device 114.

The block device 114 may include several different types of data structures, and the block device may be entirely or only partially structured with such data structures. For example, the block device 114 may be variably manipulated, such as by a client device 102, to include several data structures in hierarchical form, such as partitions, logical volumes, file systems, directories, and files. As another example, several block devices 114 may be logically associated into a multipart block device (e.g., such as Linux MD RAID device nodes or multi-volume logical volumes created using, e.g., Linux LVM) by the client device 102 or by an entity (whether logical or physical, such as a virtual machine instance provided by the system 112) under control of the client device 102. However, in some embodiments, from the perspective of the system implementing the block device(s) 114, such higher level abstractions are immaterial to the general administration of each individual allocated block device 114, as these abstractions may be created in userspace just as other data structures (such as file systems, directories, files, etc. as previously mentioned). In other words, block device(s) 114 may simply contain unstructured data from the perspective of the block-level storage service, and the structured nature of the data may only be known by a higher level system that, e.g., placed such structures or abstractions on the block device(s) 114 when manipulating them.

In some examples, the block device 114 itself may be allocated by a block-level storage service so as to transfer data stored thereon to a section of a computer-readable storage medium (such as on the same system or a different system than the block-level storage service) that has been allocated to serve as logical storage for the block device. Such computer-readable storage media may include, but are not limited to, magnetic media drives, solid state media, flash-based storage media, non-volatile memory, dynamic random access memory, and other types of hard drives and persistent storage. As may be contemplated, and as previously mentioned, a given block device 114 may have an independent relationship relative to the actual computer-readable storage medium/media on which the data is actually stored. For example, a block device 114 may span multiple media to improve utilization, redundancy, availability, durability, and the like.

In a distributed computing environment of a computing resource service provider, one or more virtual machine instances running emulations of computer systems, such as a virtual machine instance, may be configured to run on one or more computer systems of the distributed computing environment and may be made available to customers of the computing resource service provider. The customers of the computing resource service provider may provide their own operating system and applications to run on their respective virtual machine or may install an operating system and applications provided by the computing resource service provider on their respective virtual machine. In embodiments where such computing resource service providers provide block-level storage services and database services to their customers, such computing resource service providers may allow their customers, through an application programming interface function call, to create a block device, such as the block device 114, of a specified size and attach the block device 114 to their virtual machine instance such that the storage volume appears in the virtual machine instance as a storage device, similarly to a local hard drive or other local media device.

In some cases, the client device 102, the system 112, or other entity of/associated with the computing resource service provider (such as the entity implementing the block device 114) may cause the block-level storage service to take a series of snapshots 116 of the block device 114. In addition, in some cases, the client device 102 or computing resource service provider may detach the block device from one virtual machine instance and attach it to a different virtual machine instance. Application programming interface calls to a block-level storage service or database service may include function calls for creating a block device 114, taking a snapshot, attaching a block device 114 to a virtual machine instance, detaching a block device from a virtual machine instance, deleting a block device, encrypting a block device, and decrypting a block device.

In some examples, a "snapshot" may refer to copy of a portion of a block device at a particular point in time, or a copy of the entire block device. A snapshot of the present disclosure may include incremental data (which may also be referred to as a "change set") that includes data that is new or has changed since a previous snapshot was captured. In some embodiments, the incremental data is caused to be pushed from the block device 114 on a schedule, in connection with an event (e.g., changes or a specified quantity of changes within the block device over a period of time), or manually (e.g., via an application programming interface call by the system 112 or the client device 102) to the system storing the snapshots. In other implementations, the system performing the snapshots is authorized and configured to copy the incremental data directly from the block device 114 on its own. The snapshot may further include a "proportional" portion (which may be referred to as a "mandatory set") which may include a copy of a certain portion or proportion of the entire block device. In some embodiments, the proportional portion may be pushed, as with the incremental portion, by the client to the system performing the snapshot. In other embodiments, the system performing the snapshot is configured to obtain the proportional portion directly from the block device 114. Additionally or alternatively, in some implementations, the system performing the snapshot updating obtains the proportional portion from previous snapshots. In some embodiments, the "proportion" of the proportional snapshot can vary from snapshot to snapshot. In some embodiments, the snapshots are stored in a separate object storage system or via an associated data object storage service, and in some of such embodiments, access to the snapshots are obfuscated from direct access by, e.g., requestors, as they are stored and managed by the system or service that generated the snapshots (e.g., a block-level storage service or system).

Each of the snapshots 116 illustrated is shown to have been captured at a different point in time (e.g., at times $t_1$ through $t_6$). For example, the first snapshot can be seen as being captured at time $t_1$, the second snapshot can be seen as being captured at time $t_2$, and so on up to the most recently captured snapshot captured at time $t_6$. The specific capture times may be on a set schedule and/or at even intervals (e.g., as set by the snapshot capturing system, which may be the block-level storage service itself), or on demand (and therefore potentially at irregular intervals), such as by the system 112, on an request by the user device 102, and the like. Each of the snapshots 116, as previously mentioned, may capture either only a differential portion of the block device 114 relative to the immediately previous snapshot, or, in some cases, more than just such a differential portion (e.g., may contain a differential portion relative to a snapshot further back than the one immediately preceding, or may contain a proportional portion and/or the differential portion, as previously described).

As mentioned, the data "chunks" associated with each snapshot may be stored in a different system or location, such as via a data storage service or archival data storage service as described in further detail below. To track the association between the snapshots and the data "chunks" they contain, the system 112, the block device 114, or the block-level data service may track the snapshots and the location of the associated data "chunks" in a snapshot data store 110, which may be part of the system 112 or more generally implemented by a service or resource of the implementing computing resource service provider. The snapshot data store 110 may be a key-value store, a relational database, or other similar storage system capable of correlating an identified object (such as via a unique identifier, such as an identifier associated with each snapshot 116) and other data, such as location data for the associated data "chunk." Such commission of the association information in the snapshot data store may be either synchronous or asynchronous relative to the actual creation of the correlated snapshot 116.

A snapshot analysis system 108 may be implemented to analyze and model the snapshots 116. Some or all of the functionality provided by the snapshot analysis system may, similarly to the block-level storage service implementing the block device(s) 114, be partially or entirely agnostic to the contents of the block devices 114 prior to commencing analysis. For example, the capabilities of the snapshot analysis system 108 may be provided for the block device(s) 114 regardless of the data structures, file system type, partitioning, logical clustering, etc., extant on the block devices at a different level of abstraction (e.g., in user space). In some embodiments, the snapshot analysis system 108 generates structured information (e.g., metadata) about the block devices 114 regardless of the structured (or unstructured) nature of the data contained therein. In some embodiments, some or all of the functionality of the snapshot analysis system (including that of its components) may function with multiple types of snapshots, such as differential, proportional, complete, or incomplete snapshots. In some of such embodiments, even if the snapshot is incomplete, or the retrieval of data from the snapshot for purposes of analysis is incomplete (whether intentionally, or unintentionally due to corruption or unavailability), so long as the structures or signatures thereof remain available, analysis functionality provided by, e.g., a block device analyzer, file system analyzer, snapshot block device emulator, clustering analyzer, or some combination thereof, may proceed and provide accurate models, data operation results, or other information as applicable.

Some or all of the snapshot analysis system 108 may be implemented as a separate system from that of the system 112, the block-level storage service, and the like. For example, the snapshot analysis system may comprise resources of the computing resource service provider, such as those associated with virtual machine instances as previously described. In some embodiments, some or all of the snapshot analysis system is implemented as a part of (or one or more functionalities provided by), e.g., the block-level storage service that allocates the block device(s) 114. As described in further detail elsewhere herein, the snapshot analysis system 108 may comprise multiple separate functionalities, each of which may be independently implemented, and in varying ways.

The snapshot analysis system 108 may implement workflows for generating models of the snapshots 116 generated in connection with operation of the associated block devices 114. Such models may include trees, directed graphs, or other similar constructs that describe the relationship between snapshots 116, block devices 114, data structures within the snapshots and/or block devices, and other information, that allows for a given data structure described within the model to be efficiently located. Similarly, other elements, such as other data structures, snapshots, block devices, and the like, related to the data structure being searched, may also be efficiently determined, and such structured information is usable to efficiently enable several other capabilities described in this disclosure.

To facilitate the execution of such workflows and utilization of the generated models, the snapshot analysis system 108 may store the generated models in a model data store 106, which may be separate from or a part of the snapshot analysis system 108 as implemented. The model data store 106 may be any data store capable of storing the model information in a fashion that preserves the identified hierarchical relationship and conditional dependencies between components of the model. For example, the model data store 106 may be a relational database, a NoSQL database, a NewSQL database or the like.

As or after the snapshot models are committed to the model data store 106, the snapshot analysis system 108 may be configured to access such models to update them as necessary, such as when additional snapshots (which may be related to previously taken snapshots) are added or deleted. Similarly, the models in the model data store 106 may be used by the snapshot analysis system 108 to more efficiently or accurately build new models, e.g., of different snapshots of the same block device 114, or to associate previously generated models with new snapshots 116 of the same block device 114 or different block device(s). These mechanisms are described in further detail below.

The models stored in the model data store 106 may be used by a file system analyzer to process data operations related to one or more of the modeled snapshots without retrieving the entire block device to which it pertains. For example, the file system analyzer may provide an application programming interface to the client device 102 by which the client device 102 may request predefined or, in some embodiments, arbitrarily defined operations (such as operations defined by the client device using code generated by a user of the client device) on single snapshots and/or involving multiple snapshots (whether of the same given block device or as between multiple different block devices). Examples of such data operations include requests for files on the block device as a specified time, changes in a given file or other data structure during a specified timeframe, antivirus scanning of some or all snapshots for a given block device, list operations (such as lists of which files or other data structures changed within a specified timeframe), defragmentation of one or more snapshots, compression or trimming of one or more snapshots, metadata regarding the snapshots or the block device(s) 114 (such as frequency of snapshot, average size/maximum size/minimum size of snapshots, identity of users accessing the block device(s) or data structures contained therein during a specified period of time, and the like), direct access to snapshots (such as via mounting of a file system interface or block device interface for the snapshot, or the block device at a point in time represented by a given snapshot) and so on.

As may be contemplated, some data operations may require the provision of multiple snapshots as well as computational capability to perform the specified data operation. In such embodiments, the file system analyzer 104 may orchestrate the plural operations, as well as perform the associated computations. In some cases, the file system analyzer 104 may offload computational tasks to another entity, such as that of the computing resource service provider. In some of such embodiments, the file system analyzer 104 may request and utilize a virtual computing instance, such as that provided by the computing resource service provider, for such computational tasks.

Figure 2:
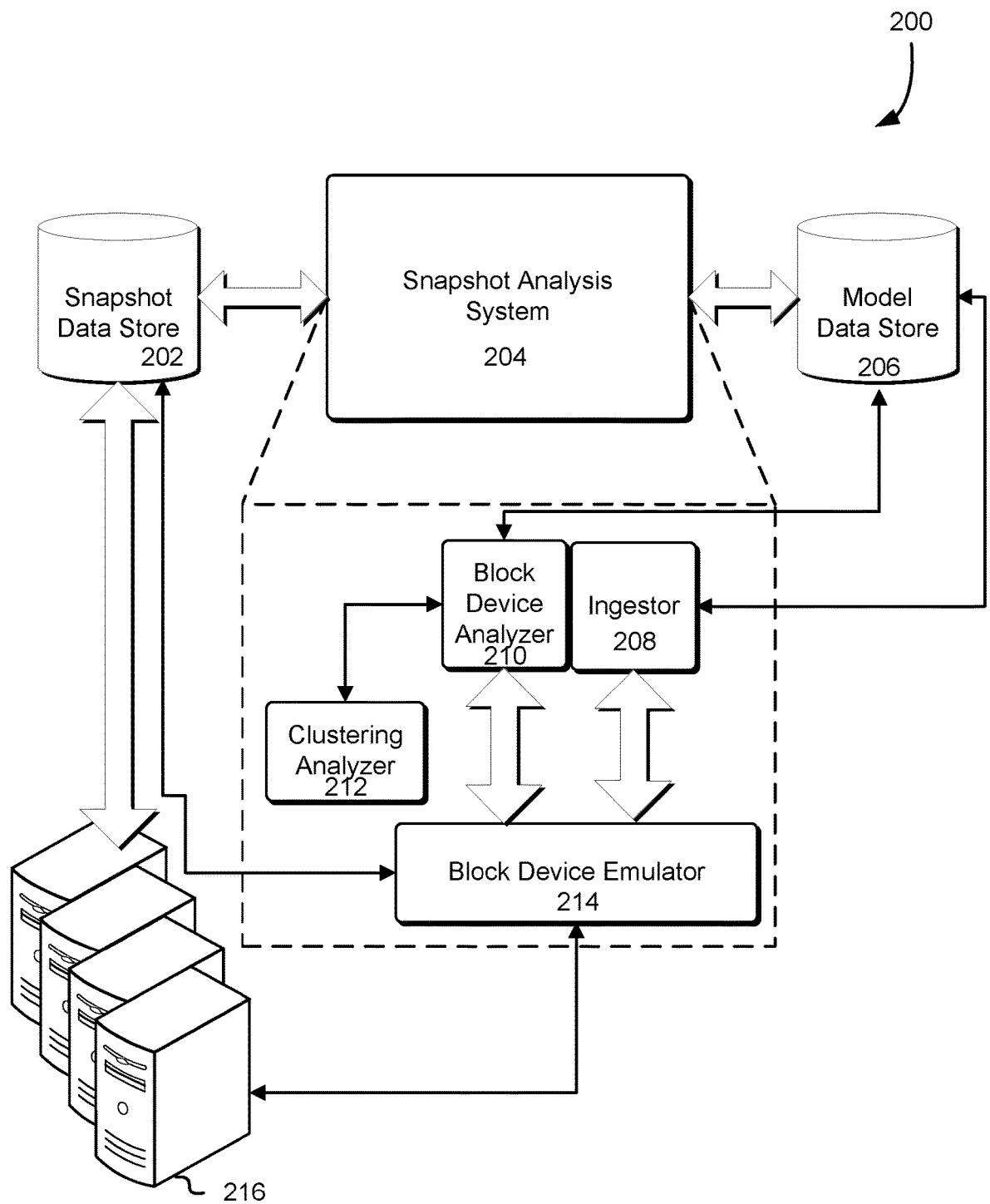
FIG. 2 illustrates an example environment in which a snapshot analysis system for processing snapshots of data stored in connection with a data storage system may be implemented in accordance with some embodiments.

FIG. 2 illustrates an example environment in which a snapshot analysis system for processing snapshots of data stored in connection with a data storage system may be implemented in accordance with some embodiments.

As described in connection with FIG. 1 above, snapshots are generated in connection with block devices allocated by, utilized by, or backed by (in terms of storage of data associated with the provisioned block devices) one or more computer system(s) 216, whether physical or virtual, in some cases via one or more services available via programmatic interfaces (such as APIs). As previously mentioned, information identifying the snapshots as well as the location of the data associated with the snapshots is stored in a snapshot data store 202. Also as previously described, the snapshot analysis system 204 may interact with both the snapshot data store 202 and the model data store 206 so as to perform the various analysis tasks, workflows, and capabilities.

The snapshot analysis system 204 may include several components, each of which is described in further detail in the figures that follow. For example, the snapshot analysis system may include an ingestor 208, a block device analyzer 210, a clustering analyzer 212, and a block device emulator 214. Such components may be used to generate snapshot models to be stored in the model data store 206 and expose specific snapshots (or sets of snapshots) in a fashion that is familiar to, e.g., an operating system or virtual computing instance implemented by or in connection with the system 216, where the system 216 may not necessarily be adapted specifically to locate data within snapshots but is capable of accessing information via, e.g., a block device driver or file system driver.

It is important to note that while the illustrated components in FIG. 2 and elsewhere within this disclosure indicate specific interactions between various components for the sake of example, other configurations are considered within the scope of the matter disclosed herein. For example, the snapshot analysis system 204 may include either or both the snapshot data store 202 and/or the model data store 206. Similarly, the clustering analyzer 212 may interact directly with the block device emulator 214 rather than with the block device analyzer 210.

As illustrated, a block device emulator 214 is configured to provide a block device interface for snapshots used, allocated, or used by the computing system 216, and may interact with a snapshot data store 202 to locate the data chunks associated with the snapshots for which it is to provide a block device interface. The block device interface provided by the block device emulator may be variably used by the ingestor 208 and the block device analyzer 210 for the functions they provide, described in further detail elsewhere within this disclosure. As illustrated, the ingestor 208 and the block device analyzer 210 also interact with the 206 model data store in varying ways, also described in further detail elsewhere herein.

For example, the ingestor 208 may instantiate a block device emulator 214 to expose block devices for snapshot data to quickly scan snapshots, or specific portions of snapshots (e.g., identifiers or headers within the data associated with the snapshots) to place root nodes within the model data store 206 that identify the snapshots and serve as a starting point for the snapshot models eventually built by the block device analyzer 210. Furthermore, the block device analyzer 210 may utilize the block device emulator 214 in a similar way to access block devices associated with snapshot data, but may perform deeper or more complex scans of the snapshot data to, e.g., iteratively build models of such snapshots, and store them within the model data store 206 in connection with the root nodes placed there by the ingestor. Similarly, a clustering analyzer 212 may (via the block device analyzer 210, of which it may be a part) utilize the block device emulator 214 to perform signature scanning, heuristics, or related data access of the snapshot data of multiple snapshots via the block device emulator 214 to computationally determine the relationships between snapshots, e.g., membership of the underlying block devices the snapshot represent with multipart block devices, and similar update models within the model data store 206.

As may be contemplated, the order in which the varying components of the snapshot analysis system 204 performs its task may vary depending on the implementation. For example, the clustering analyzer 212 may perform clustering analyses prior to other snapshot analysis provided by the block device analyzer 210. In some cases, the varying tasks/workflows described herein may be performed partly or entirely in parallel, sequentially (e.g., one task/workflow having a dependency on the completion of another), or some combination thereof.

Figure 3:
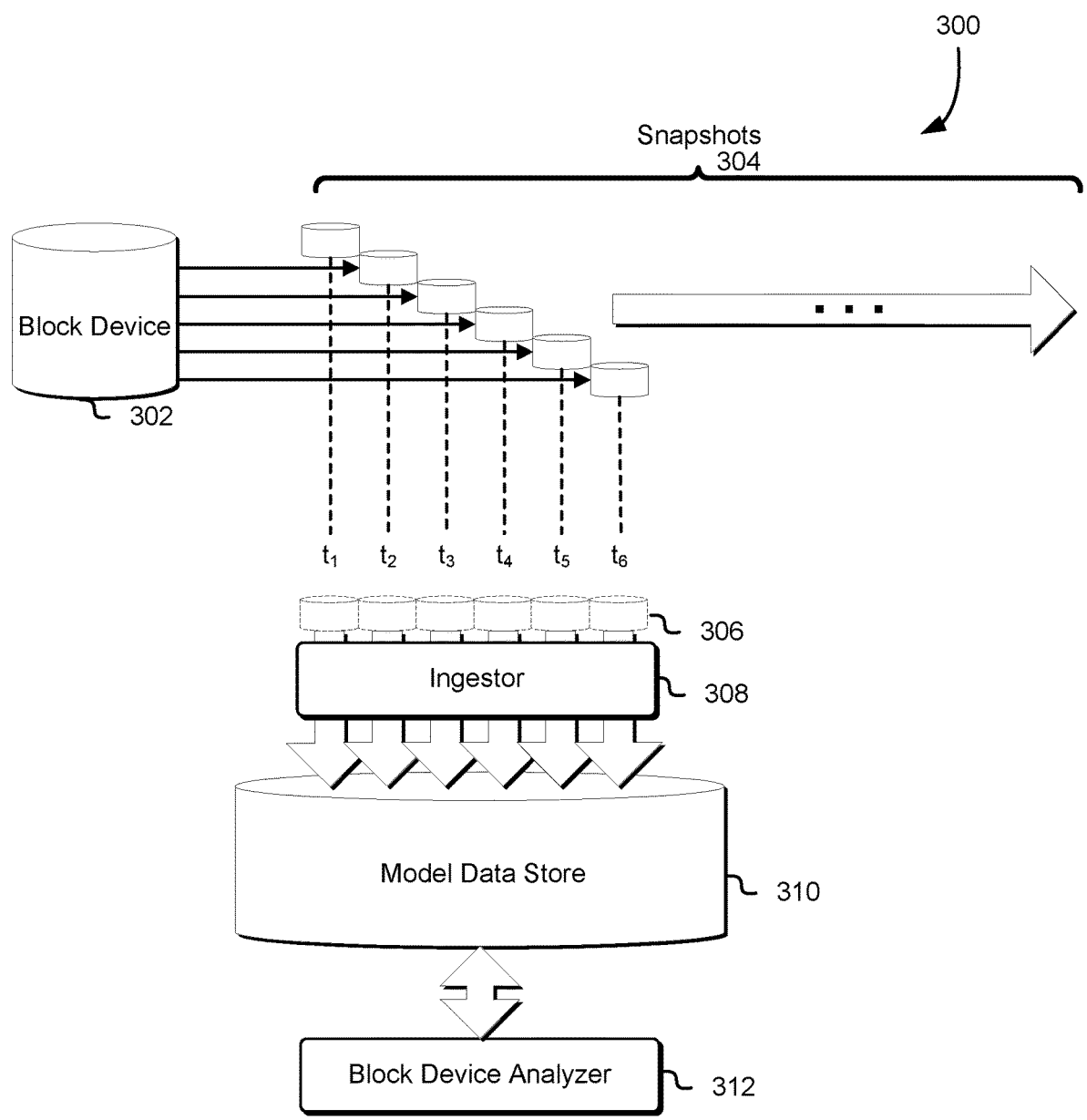
FIG. 3 illustrates an example environment in which one or more snapshots may be ingested and subsequently analyzed, in accordance with some embodiments.

FIG. 3 illustrates an example environment in which one or more snapshots may be ingested and subsequently analyzed, in accordance with some embodiments.

As previously discussed in connection with at least FIG. 1, snapshots 304 are taken of a block device 302 over a period of time (shown here as time points $t_1$ through $t_6$). Asynchronously or synchronously relative to the time of capture of the snapshots 304, an ingestor 308 detects, such as by the implementation of a listener on an entity involved in the storage or creation of the snapshots 304, or is provided (such as by an entity involved in the storage or creation of the snapshots 304), snapshot data 306 for each of the snapshots 304. As described elsewhere herein, the ingestor 308 may utilize a block device emulator to read the snapshot data 306.

The ingestor may initially process the snapshot data 306 to place root nodes for each snapshot 304 into a model data store 310. As described in further detail below, each snapshot may, after analysis, may be made addressable (through block device emulation) to a client device or file system analyzer as an individual block device, and as such, the root node may correspond to that of a snapshot block device representing each individual snapshot 304 as a whole. As described in further detail herein, such root nodes are in some embodiments the starting point for snapshot models to be built by the block device analyzer 312.

Accordingly, in some embodiments, and synchronously or asynchronously relative to the placement of the root node for each snapshot within the model data store, a block device analyzer 312 builds models of each snapshot 304 starting from the root node representing the snapshot 304. As the block device(s) 302 themselves may contain data, which may be arbitrarily structured, unstructured, or some combination thereof, the snapshots 304 derived therefrom may also contain such arbitrarily structured (or unstructured) data, the structure (or lack thereof) may be easily observable in userspace, but not necessarily from the perspective of the block device analyzer 312, which may be implemented by a block-level storage service.

To build snapshot models from snapshots of which it has no or limited prior knowledge, the block device analyzer 312 loads the snapshot data 306, such as by use of a snapshot block device emulator as discussed in further detail elsewhere herein, and traverses the contents of the snapshot data 306 to determine the contents and organization of the data/data structures contained within.

For example, the block device analyzer 312 may have access to a known set of information from which it may draw inferences or conclusions regarding the contents of the snapshots 304 it analyzes. In varying stages of the block device analyzer's analysis, it may look at specific locations (e.g., offsets) within the snapshot data (e.g., at specific offsets within the corresponding emulated block device) to determine whether, e.g., header and/or trailer data exists, and the existence and/or contents of such data at those locations may cause the block device analyzer 312 to determine that the data within the snapshot block device is of a certain type or is organized in a certain fashion. Additionally, such specified locations may include other data that points to the organization and/or relationship between data structures within the snapshot data, and with such further information, the block device analyzer 312 may make additional reads of other specific locations and subsequent determinations.

For example, a snapshot may include specific signatures (e.g., trailer or header data) at known offsets that indicate the presence of a certain type of partition or logical volume. Similarly, the snapshot may include a file allocation table or journal at a specific offset relative to that of the start or end of the previously determined logical volume or partition, thereby allowing the block device analyzer 312 to infer the existence of (and specific type of) a file system. The block device analyzer 312 may then read the file allocation table or journal to locate the existence of specific directories, files, or other structures. Each located data structure may be added to the model, either as they are found, or in a batch at some later point (e.g., upon completing analysis of a given snapshot or group of snapshots).

The analysis process may, in some cases, proceed iteratively until either the entire snapshot block device has been scanned, or, in some embodiments, until a specific type (or multiple types) of data structure has been located. As the analysis process proceeds, the models stored in the model data store are updated to reflect the relationships between the types of data structures found, the block device(s) to which they are associated, the time at which they were initially captured, and the like. The models are configured to be traversable by a requesting entity.

It may be contemplated that, given the time-based nature of snapshot generation, some snapshots of, e.g., the same given block device 302, may reflect similar or identical structures if little or nothing is changed within the block device 302 between snapshot times. In some embodiments, the models generated may reflect that such snapshots contain limited or no changes relative to previous snapshots (or in some cases, the initial and/or present state of the block device 302 in question). In some of such embodiments, the data structures are not replicated within the model, and are only described by reference, in a similar fashion to that of the underlying snapshot (assuming that the snapshot is differential relative to the previous snapshot(s)).

Figure 4:
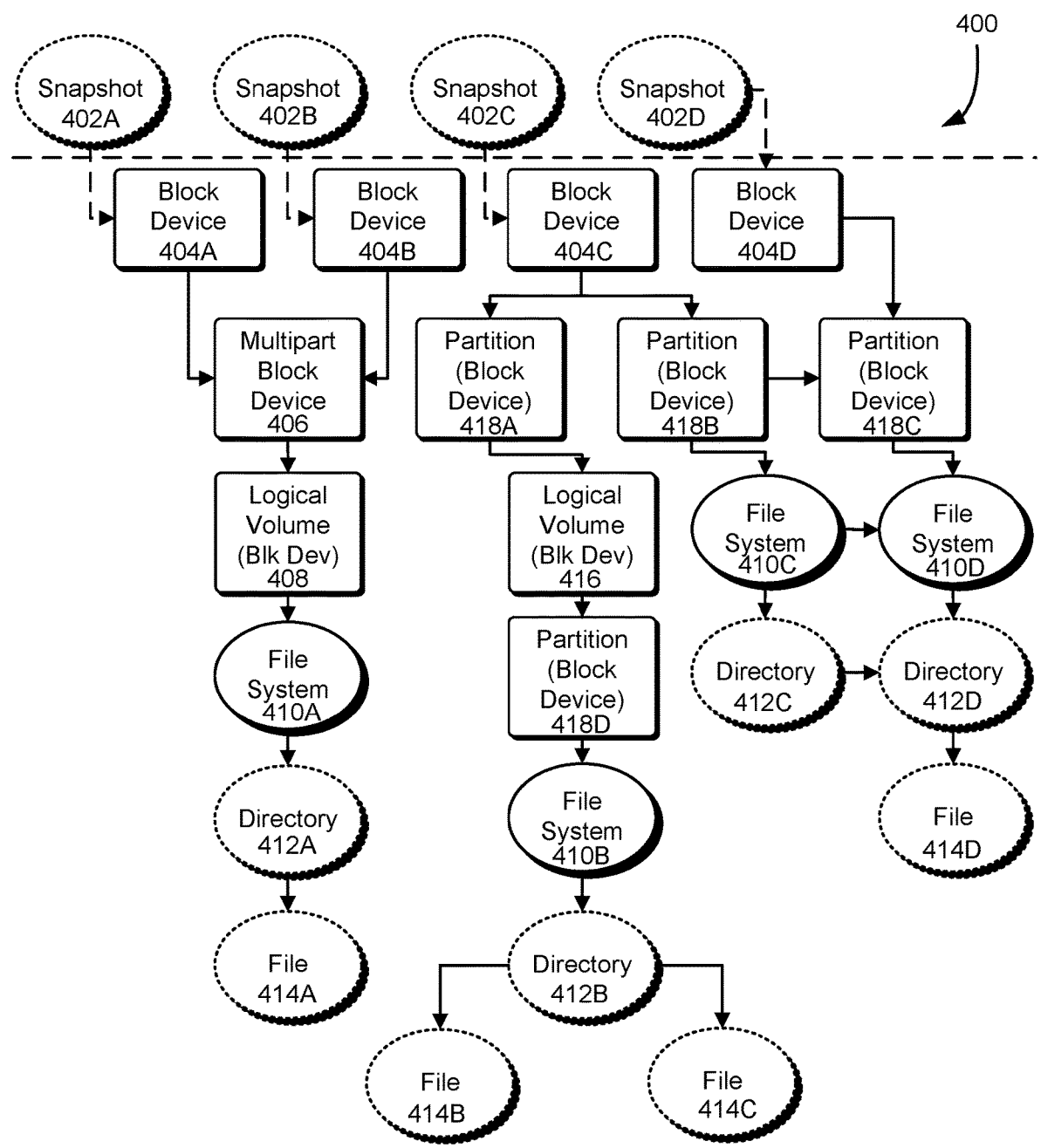
FIG. 4 illustrates an example model representing one or more analyzed snapshots, in accordance with some embodiments.

FIG. 4 illustrates an example model representing one or more analyzed snapshots, in accordance with some embodiments.

The models generated by the snapshot analysis system described in further detail elsewhere herein may be any type of graph that describes, in structured fashion, the data structures within a given snapshot as well as between snapshots (whether of the same block device or between different block devices). For example, in some embodiments, the models may be directed graphs, such as directed acyclic graphs. A directed acyclic graph (DAG) 400 associated with four snapshots 402A, 402B, 402C, and 402D is illustrated in FIG. 4 for illustrative purposes.

In the illustrated DAG 400, the snapshots 402A-D are associated with root nodes 404A-D for block devices associated with each individual snapshot 402A-D, respectively, as might be generated after ingestion via the techniques described above in connection with FIG. 3. The vertices (denoted as ovals) indicate data structures (or versions thereof), while edges (denoted as solid arrows) indicate associations between data structures (either within the same snapshot or to other snapshots of the same block device). As illustrated, at this level of the analysis, the existence of each snapshot block device 404A-D is agnostic of the structures 406-414A, as each snapshot of each individual block device 404A-D may be addressed and accessed individually.

As illustrated, the block devices 404A-B correspond to multipart block device 406, which may be a logical volume spanning multiple block devices 404A-B, such as an MD RAID volume or an LVM volume. The identification of such constituent block devices 404A-B as members of the multipart block device 406 may be determined by a clustering analyzer, described in detail in FIG. 5 below, and which may be part of the block device analyzer in some implementations (and separate from it in others). Briefly, the clustering analyzer may, similarly to the block device analyzer, search for known signatures at specific locations or by scanning (e.g., linearly) some or all of the snapshot block device (e.g., using a block device emulator), so as to determine whether the snapshot is of a block device that is a constituent of a multipart block device.

The block device analyzer may, with respect to the multipart block device 406, perform additional analyses to discover, for example, that a logical volume 408 resides within the multipart block device 406, a file system 410A exists within the logical volume 408, and the file system 410A contains a directory 412A which in turn includes a file 414A. Such structures may be discovered by the block device analyzer either through a brute force linear scan and subsequent analysis, or, in some embodiments, by using knowledge of signatures (e.g., headers, trailers, or other contents, or specific locations/offsets within the block device/volume/file system/etc.) of each specific type of data structure, which may be defined in advance of the analysis or iteratively determined via, e.g., machine learning algorithms.

In the illustrated example, the portion of the DAG 400 for the structures contained within the block devices 404A-B reflect that no other versions of those structures yet exist. Similarly, the structures within the partition 418A of snapshot 402C (and corresponding snapshot block device 404C) indicate only one version of the inherited block device 416 (formed within the partition 418A), the partition 418D created within the block device 416, the file system 410B within the partition 418D, and the directory 412B within the file system 410 (as well as files 414B-C in the file system 410).

However, snapshots 402C and 402D are illustrated as reflecting different states of the same parent block device from which they were taken. Relative to the state reflected in snapshot 402C, snapshot 402D does not indicate that partition 418A was changed relative to snapshot 402C, as partition 418A simply does not exist within the portion of the tree for snapshot 402D. However, as noted by the edge between partition 418B of snapshot 402C and partition 418C of snapshot 402D, the same underlying partition reflected in the respective snapshots 402C-D differed. Similarly, as between the two snapshots 402C-D of the same underlying block device, file system 410D reflects a change relative to file system 410C, and directory 412D reflects a change relative to directory 412C. As illustrated, the file 414D appears in snapshot 402D but does not appear within 402C, indicating that the file associated with vertex 414D first appeared at the time the snapshot 402D was generated.

In some implementations, certain types of structures, when found by the block device analyzer, are treated as block devices for the sake of analysis. For example, as illustrated in FIG. 4, block devices 404A-D (corresponding to the root nodes associated with the snapshots 402A-D), the multipart block device 406, partitions 418A-D, and the logical volumes 408, 416, all denoted using rectangles rather than ovals, may be read as block devices when those types of structures are found. Accordingly, in some implementations and in the illustrated example, a snapshot root node block device 404C may contain a partition table that denotes two partitions—418A and 418B, which are then read as block devices to determine the contents therein. In the case of partition 418A, the block device analyzer may analyze the partition 418A as a block device, and further locate a signature associated with the logical volume 416, which would also be treated as a block device, which in turn would be analyzed by the block device analyzer so as to find the signature of another partition 418D within. This process may continue iteratively and, in some cases, indefinitely, until a specific type of structure is found. For example, an implemented block device analyzer may stop its iterative analysis when it finds a file system in a specific portion of the tree—such as file system 410B in the partition 418D. In such examples, analysis information related to the hierarchy of objects/data structures within the terminal nodes (denoted using ovals with solid borders) may be handled by a different system or analyzer, or, in some embodiments, performed by the block device analyzer but stored in a different model or structure (e.g., a file system index associated with the respective file systems).

As may be appreciated, the use of DAGs or similar types of models greatly eases the traversal of large numbers of snapshots by allowing for a quick, directed lookup for several different types of information related to the data structures reflected in snapshots at specific points in time, as well as easing comparative lookups and other such data operations.

Figure 5:
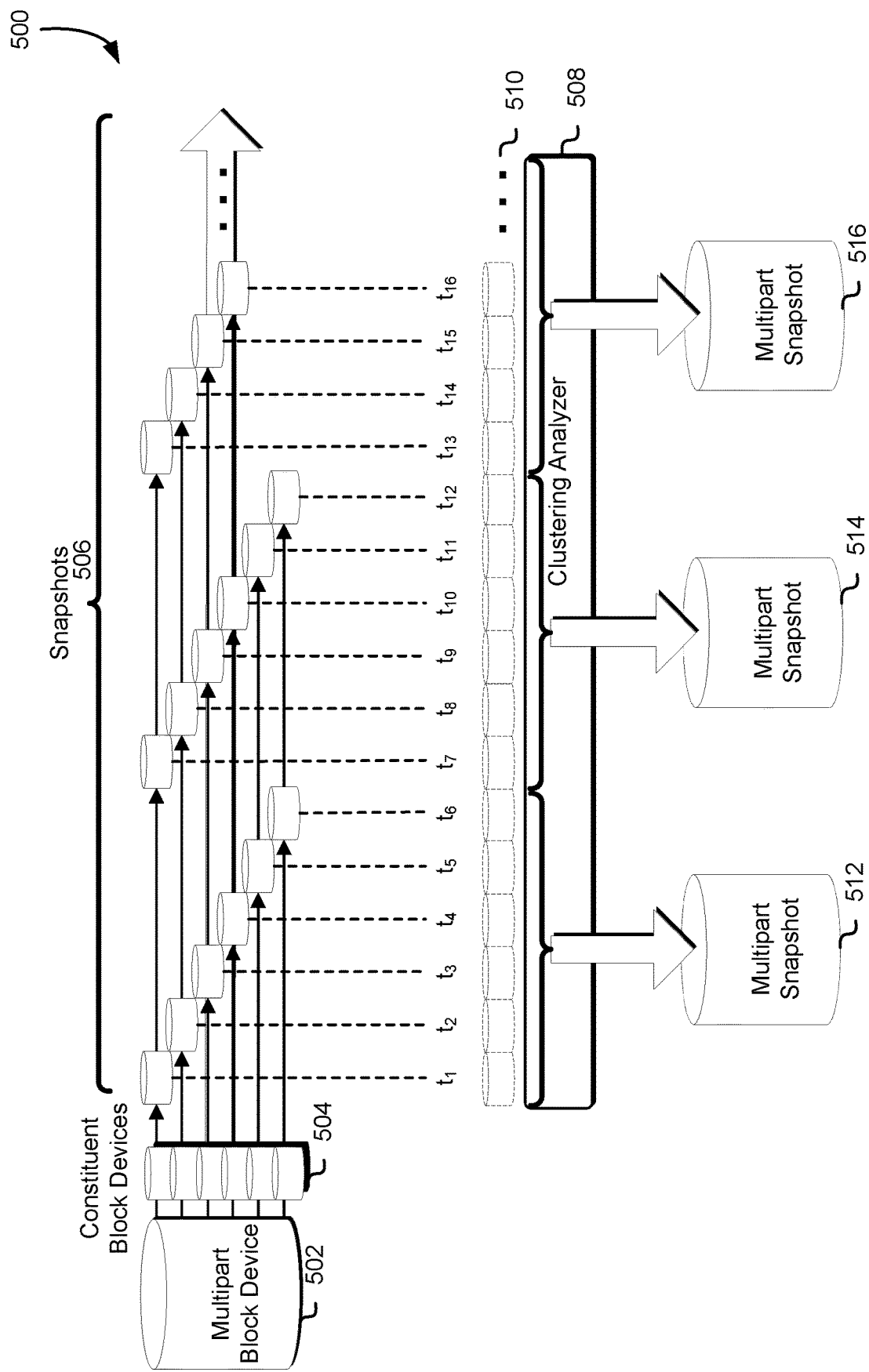
FIG. 5 illustrates an example schematic in which snapshots associated with multipart block devices may be analyzed and clustered in accordance with some embodiments.

FIG. 5 illustrates an example schematic in which snapshots associated with multipart block devices 502 may be analyzed and clustered in accordance with some embodiments.

As may be contemplated, in implementations where a block device is snapshotted at a certain interval at an individual level regardless of its association with other block devices in a multipart block device, a "cloud" of snapshots 506 may be generated where it may be difficult to separate a snapshot of a given constituent block device 504 with a different snapshot of the same constituent block device (see, e.g., snapshots at $t_1$, $t_7$, and $t_{13}$, all of which are associated with the same constituent block device 504 of the multipart block device 502). As many multipart block devices denominate their constituent block devices by a unique identifier, but such unique identifiers remain the same over time, standard multivolume drivers (such as MD, LVM, or the like) cannot differentiate between snapshots of a constituent block device and as such, require external characterization of consistent groups of constituent snapshots of such multivolume drivers are used to combine associated snapshot block devices as coherent multipart block devices that together reflect the state of a multipart block device 502 at a given time. It may readily be appreciated that mounting a multipart block device that consists of snapshots of inconsistent versions of associated with the constituent block devices 504 of the multipart block device 502 (e.g., inadvertently loading the snapshots $t_4$-$t_6$ and $t_7$-$t_9$ as one six-device volume) may have unintended consequences, such as corruption of data or lack of readability.

To avoid such issues, the clustering analyzer 508 may be implemented to determine, deterministically, heuristically, stochastically, or otherwise, whether data of individual snapshots 510 are associated with block devices that stand alone or are constituent block devices 504 of a multipart block device 502, and in the case that they are likely constituent block devices 504, whether the snapshots 506 associated therewith are from the same "version" of the overall multipart block device 502 from which they derive (even if the clustering analyzer has no prior specific knowledge of the configuration of the multipart block device 502 in question).

In some embodiments, as an initial analysis, the clustering analyzer may use a signature scanning algorithm to compare header, trailer, or other data, against specific patterns associated with different types of multipart volumes/block devices, in a fashion similar to that used by the block device analyzer previously described to determine the presence and contents of other data structures (such as file systems, logical volumes, and the like). For example, certain types of multipart block devices include header and/or trailer information at specific offsets within the block device to denote the identity (e.g., UUID) of the constituent block device as well as the type of multipart volume (e.g., MD RAID, LVM, etc.) to which it belongs. The presence or absence of such signatures allow the clustering analyzer to deterministically filter a large "cloud" of snapshots into those that are associated with a given multipart block device 502 and those which are not, thereby reducing the uncertainty and load when performing the second portion of the clustering analysis, described immediately below.

For the second analysis, the clustering analyzer 508 may implement one or more clustering techniques to determine, in some cases probabilistically, which individual snapshots not filtered in the initial analysis belong to which "version" of the multipart block device 502. As illustrated, for snapshots taken at the constituent block device level at times $t_1$-$t_{16}$, the first six belong to one "version" of what can be considered as a multipart snapshot 512 of the multipart block device, thereby reflecting the contents at the timeframe between the snapshots taken at $t_1$ through $t_6$. Similarly, the clustering analyzer may determine that the snapshots at $t_7$ through $t_{12}$ correspond with multipart snapshot 514, and so forth (e.g., 516).

While time of snapshot is illustrated as a criterion by which the clustering analyzer may make its inferences as to which snapshots belong to which version of the multipart block device, several other input criteria may be considered by the clustering analyzer 508. Such criteria may include one or more of the identity of the virtual computing instance to which it is or was attached, the time at which the constituent block device was last accessed, the contents of the constituent block devices (e.g., relative to that of the multipart block devices), sequence numbers or other identifiers associated with the snapshots and/or the constituent block devices 504, capacity and/or data usage information for the constituent block devices over time and/or version, and the like. Using these criteria and other parameters, the clustering analyzer may make one or several clustering analyses and compare the outcomes of each. The clustering analyses undertaken may include one or more of nearest neighbor search, a k-nearest neighbor search, a Bayesian network/Bayesian inference, heuristic analysis, frequentist analysis/inference, k-means clustering, closest neighbor binary clustering, hierarchical clustering (either agglomerative or divisive), HCS (highly connected subgraphs) clustering, or other types of cluster analysis techniques to determine likely clusters from among, e.g., different snapshot versions of the respective constituent block devices. In implementations where the clustering analyzer 508 does not use a deterministic approach at this stage, different probabilistic approaches may be implemented in parallel, and a meta-analysis of the outcomes of the different probabilistic approaches may be performed to determine the snapshot/block device cluster combinations that are most likely to be correct.

In some embodiments, the clustering analyzer 508 may use machine learning techniques, such as supervised learning with previous results (and the accuracy/correctness thereof) as ongoing inputs, to improve the probability of correct clustering, as well as the identification of more/less effective algorithms/models used in the analyses, over time and/or iteration. For example, the success outcome (or lack thereof) of mounting a determined cluster of constituent block devices (or snapshot block devices thereof) may inform a supervised learning model implemented by the clustering analyzer 508 to adjust its clustering techniques or mark certain techniques as preferred or to be avoided as less effective.

Figure 6:
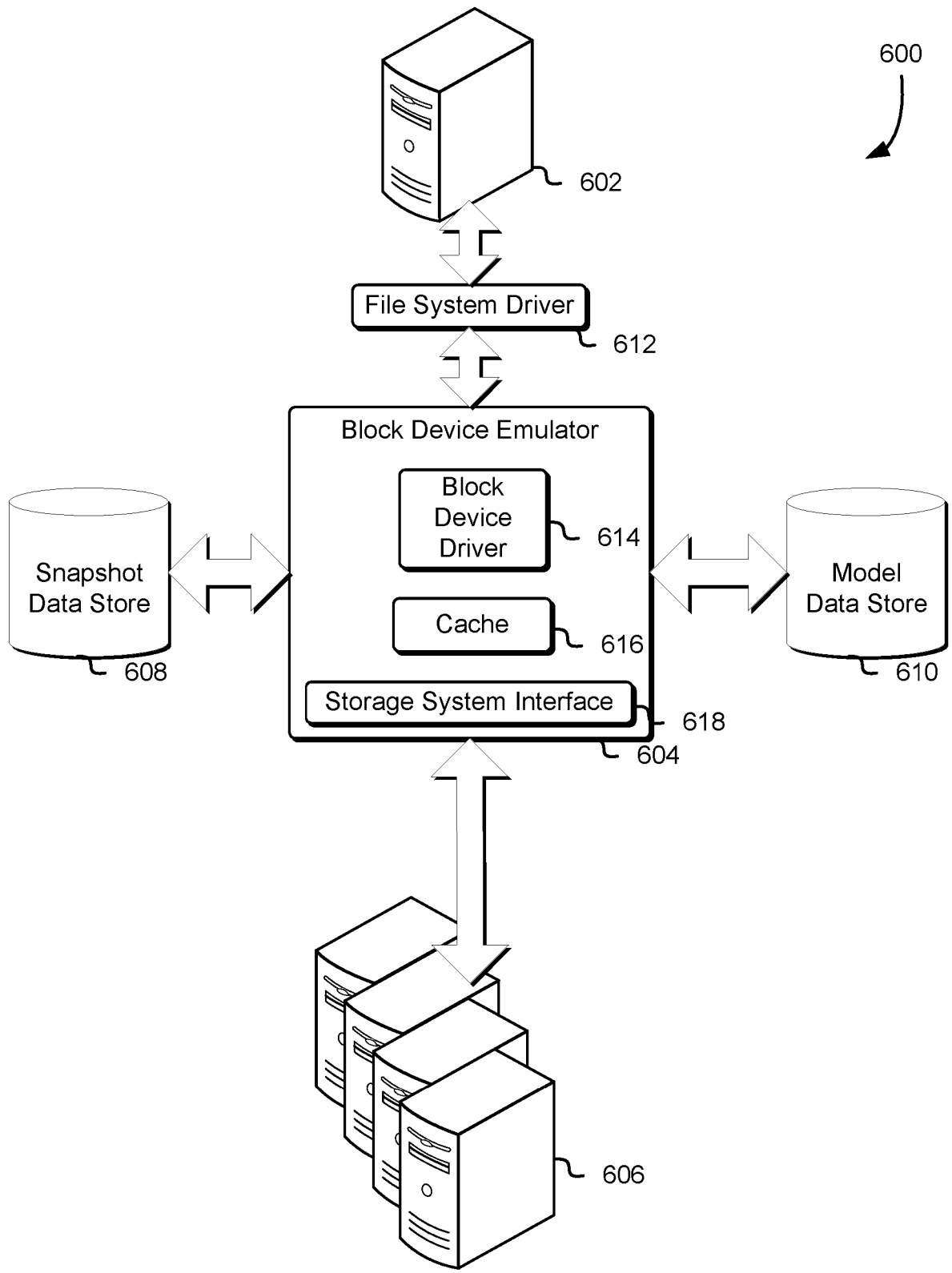
FIG. 6 illustrates an example environment in which a block device emulator may be implemented, in accordance with some embodiments.

FIG. 6 illustrates an example environment in which a block device emulator 604 may be implemented, in accordance with some embodiments.

As previously mentioned and as may be appreciated, several of the techniques discussed herein may utilize snapshot data, rather than a fully restored version of the block device data. Also as previously mentioned, in some embodiments, the snapshot data may be exposed directly for manipulation by, e.g., a system or client device (e.g., 602 as illustrated). For example, the snapshot models generated by the ingestor, block device analyzer, and clustering analyzer previously discussed may be stored in a model data store 610, and the information stored therein may enable a computing resource service provider to provide a service to, e.g., a client device, that processes data operations related to one or more of the snapshots without retrieving the snapshot and restoring the state of the entire block device to which it pertains. Instead, the implemented system may utilize a snapshot block device emulator 604 that exposes only the data (e.g., the differential data) within the snapshots applicable to an incoming data operation request.

The snapshot block device emulator 604 may interface with a snapshot data store 608 to determine the location of the specific "chunk" or "chunks" of data associated with the snapshot it is to expose, such as in response to a command or request of a client device or other requesting computing system 602 (e.g., via an application programming interface). The emulator 604 retrieves the chunks from the location (e.g., on a data storage system or service 606) at which they are stored, such as via storage system interface 618. In some embodiments, the storage system interface 618 provides API calls to the data storage system or service 606 so as to retrieve the chunks.

Depending on the specific data operations requested, the emulator 604 places some or all of the retrieved data chunks in a memory cache 616. The memory cache 616 may be transitory memory (such as random access memory) or non-transitory memory (such as a disk drive, solid state drive, or other such media). In some embodiments where not all of the chunks necessitated by a given data operation are placed within the cache, the emulator 604 may predictively cache the portion of the retrieved data determined to be likely to be accessed frequently, and in the case where the cache 616 is not large enough to accommodate all of the chunks used within a given data operation, such chunks are discarded and in the event that they need to be accessed at some later point, the emulator may retrieve such chunks and in some cases may evict the least recently used data within the cache to accommodate the newly retrieved chunks (e.g., operation of the cache as a LRU cache). The size of the cache 616 may be preconfigured or, in some embodiments, may be adjusted by the block device emulator in connection with an analysis of the incoming data operation or request itself that predicts or determines the size of the data to be retrieved from the data storage system/service 606 in response to the requested data operation.

The snapshot to be presented as an emulated block device is presented as a whole as an addressable snapshot block device via a block device driver 614, such as that provided by the Linux block layer. To the extent that data requested via the block device driver 614 is available within the cache 616 (e.g., pre-retrieved, such as in connection with an incoming data operation request), block device commands are serviced by the block device driver out of the cache 616. In scenarios where the data requested via the block device driver 614 are not present within the cache, the block device commands are translated by, e.g., the storage system interface 618, into retrieval commands for the data storage system/service 606, and the retrieved data is provided via the block device driver 614. In some of such embodiments, the newly retrieved data is placed within the cache after the least recently used segment then present within the cache is evicted, and the block device driver 614 then services the request from the cache 616.

In certain implementations, the emulator 614 (and/or other entities, such as the requesting entity, which may include but is not limited to the client device, the file system analyzer, the block device analyzer, the data storage system, and/or the originating block-level storage service) may also retrieve the associated model from the model data store 610 for the exposed snapshot to determine one or more file systems associated with the snapshot, and in accordance, may configure the appropriate file system driver(s) 612 and present the snapshot block device as a file system device to, e.g., the requesting system 602. Depending on the requested data operation, the file system device and/or the snapshot block device may be provided directly to the requestor, or another entity (such as a file system analyzer as previously described), and may interact via the emulated snapshot block device and/or the file system device to perform the data operations requested (e.g., retrieval of specific files, differential comparisons of portions of snapshots, generation of metadata of the captured snapshots, etc.).

In some embodiments, block device commands and/or associated file system commands to the emulator are processed according to the capabilities of the entity issuing the commands, that of the emulator, and/or that of the system or service from which the snapshot data was retrieved. In some embodiments, write commands to the snapshot data retrieved and exposed by the emulator are serviced successfully, from the perspective of the issuer of the write commands, and in some of such embodiments, written to the emulator cache or other data storage accessible to the emulator. However, in some of such embodiments where the system or service from which the snapshot data was retrieved is not capable of (or not configured to) accept modifications of the data or commission of any new data related to the snapshots, the changes to the snapshot data within the emulator (exposed by the snapshot block device) and perpetrated by the connecting entity are discarded once the requestor disconnects from the emulator (and thus, not committed back to the service or system from which the snapshot data was originally retrieved by the emulator).

Figure 7:
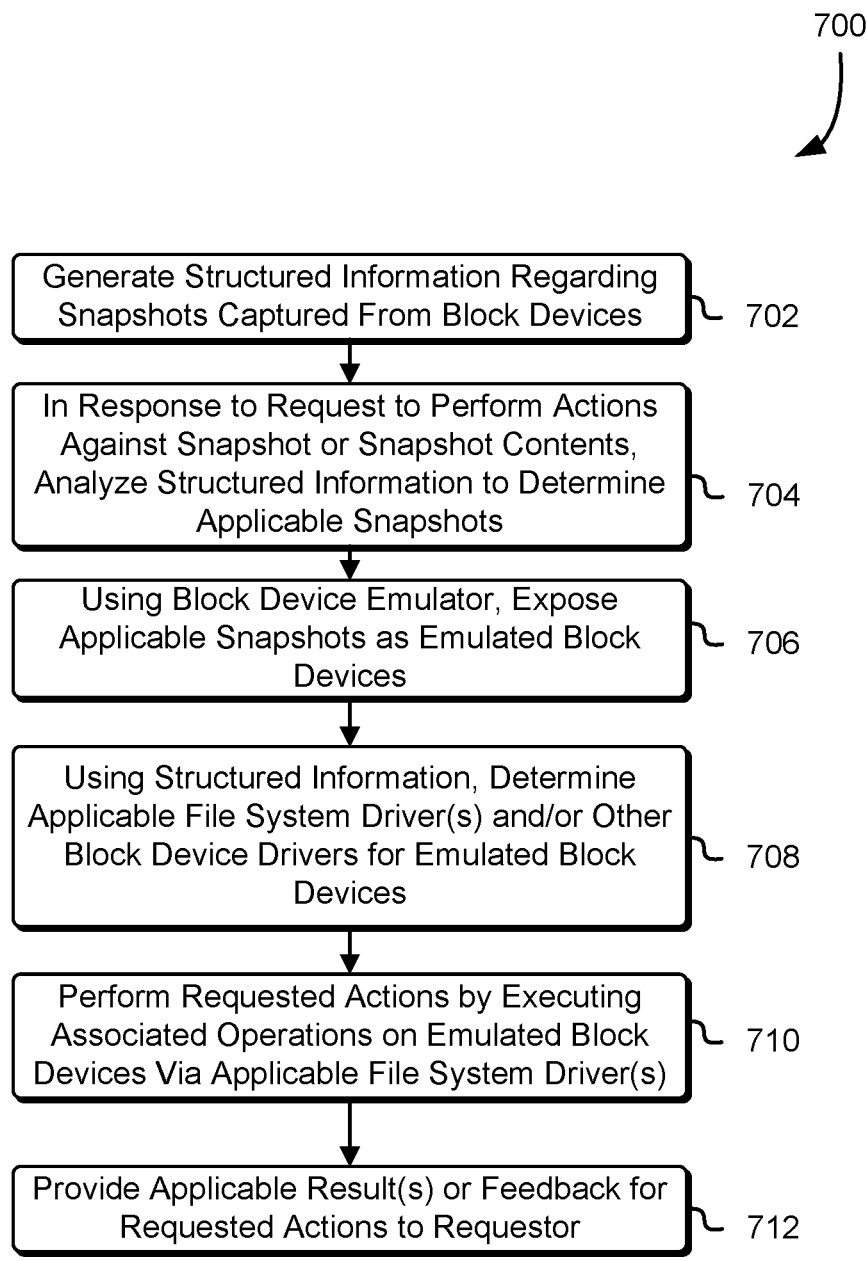
FIG. 7 illustrates an example process for handling requests related to analyzed snapshots, in accordance with some embodiments.

FIG. 7 illustrates an example process for handling requests related to analyzed snapshots, in accordance with some embodiments.

At step 702, an entity, such as a snapshot analysis system previously described, generates structured information regarding snapshots captured from block devices allocated by, e.g., a block-level storage service. In some embodiments, the snapshots themselves may contain structured data, unstructured data, or a combination thereof, and prior to analysis, neither the block-level storage service nor the snapshot analysis system has any prior knowledge of the specific structure of the block devices to be analyzed. The structured information generated, as previously described, may include one or more models, such as directed acyclic graphs, that indicate the relationship between snapshots, block devices, and the like.

At step 704, in response to a request, such as of a client device or system of a computing resource service provider, to perform data operations or other actions on one or more snapshots (or the contents thereof), the structured information generated in connection with step 702 is analyzed, such as by a file system analyzer or a block device emulator, to determine which snapshot or snapshots apply to the request. For example, if the data operation request involves a comparison of two versions of a given file, it may be appreciated that the operation request would necessitate the retrieval and analysis of two different snapshots containing different versions of the same file.

At step 706, using a block device emulator implemented by the computing resource service provider, the snapshots determined in step 704 are exposed as snapshot block devices, and at step 708, the structured information is used by the emulator to determine which file system driver(s) are appropriate for the block devices.

At step 710, the requested data operations are executed using file system commands against the file system device(s) exposed in step 708, and the results are processed, such as by a computational device of the computing resource service provider (e.g., the file system analyzer), for provision to the requestor. After the operation completes and the results are generated, at step 712, the result(s) of the requested data operation are provided to the requestor. In some embodiments, the result is returned asynchronously relative to the incoming request at step 704. In other embodiments, the result is returned synchronously relative to the incoming request. As applicable, the result (e.g., the diff of two files, or the file(s) themselves) are provided either in direct response (e.g., via an API) to the request, or is provided via an intermediary (e.g., a link to a location at which the result can be downloaded, such as a data storage device or service provided by the computing resource service provider).

Figure 8:
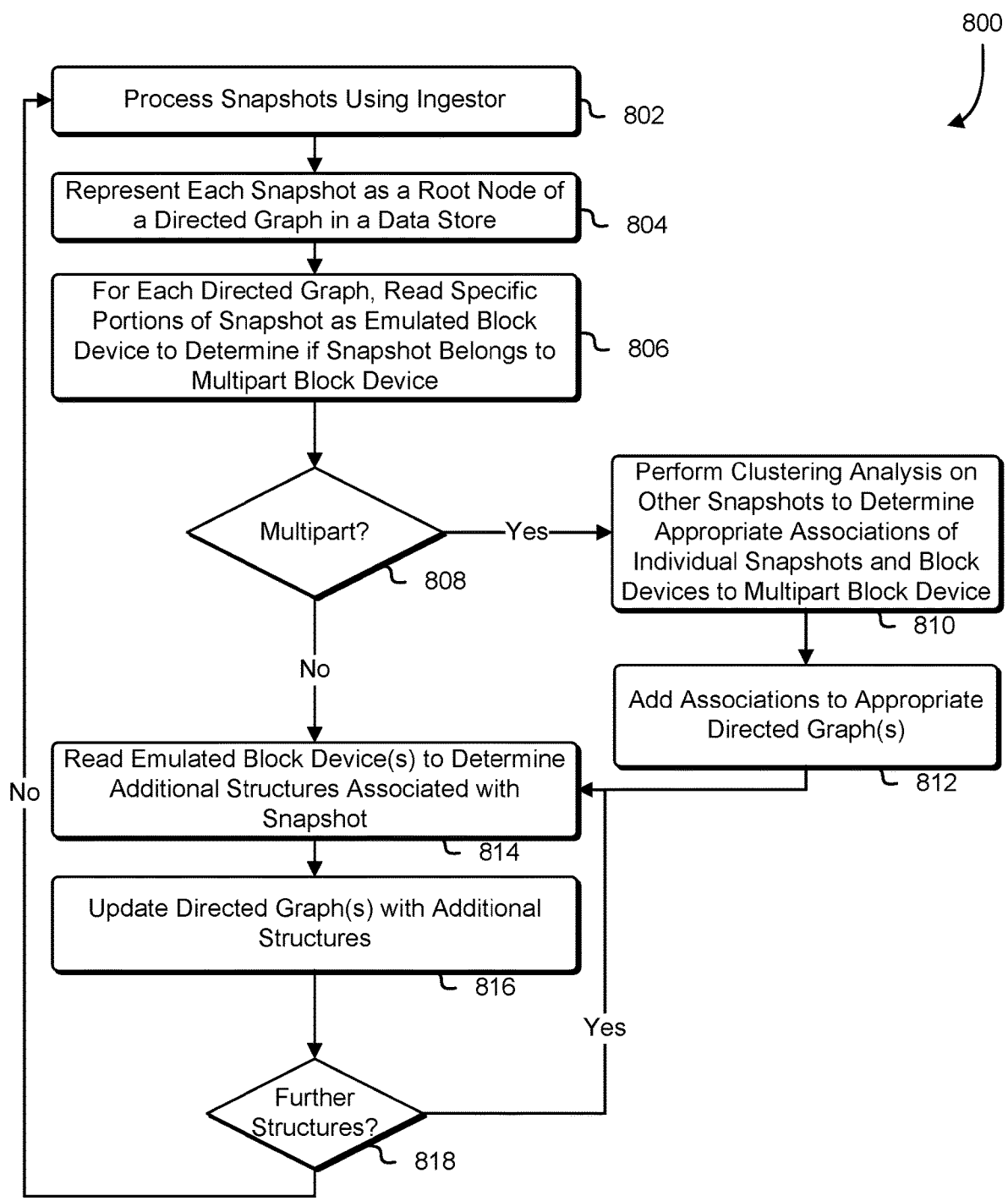
FIG. 8 illustrates an example workflow for analyzing snapshots to generate models therefrom, in accordance with some embodiments.

FIG. 8 illustrates an example workflow for analyzing snapshots to generate models therefrom, in accordance with some embodiments.

At step 802, snapshots generated in connection with operation of a block device allocated by, e.g., a block-level storage service, are processed by an ingestor, which may in some embodiments implement a listener that activates the ingestor when new snapshots are detected. At step 804, each snapshot is represented by a root node of a directed graph or other model initialized by the ingestor and stored by the ingestor on a model data store.

At step 806, the block device analyzer (and/or clustering analyzer) detects the presence of initialized but incomplete models in the model data store, and initially determines whether the associated snapshot is for a constituent block device of a multipart block device, e.g., using signature scanning and matching techniques discussed previously. At decision point 808, if the snapshot is determined to be for a constituent block device of a multipart block device, at step 810, the clustering analyzer performs one or more clustering analyses against other snapshots determined to be associated with multipart constituent block devices, and after it makes a clustering determination, adds such associations to the appropriate directed graph(s) or models at step 812. It is contemplated that the determination of a snapshot's association with a multipart block device (step 806), as well as the clustering analysis (810) and associated directed graph update(s) (812), may in some embodiments be performed asynchronously relative to the remainder of the analysis 800, and in such embodiments, the independent determinations of the two asynchronous portions of the analysis may influence one another as they independently proceed and complete at potentially different times.

After this is complete, or if the snapshot is determined at decision point 808 as not associated with a constituent block device of a multipart block device, at step 814 the snapshot is read as an emulated block device, such as by a block device emulator, to iteratively determine whether the snapshot contains other known data structures, and if so, the relationships between them as well as previously analyzed snapshots (e.g., new versions of structures within the same block device(s)). To the extent that such structures are found, at step 816, the block device analyzer adds them to the appropriate model(s) stored in the model data store. At decision point 818, the process continues iteratively if further structures are found, starting from step 814. If no further structures are found at decision point 818, or if the analysis has reached a predetermined end point (e.g., the discovery of a specific type of data structure or contents), additional snapshots are processed and the process repeats from the beginning, at step 802.

Figure 9:
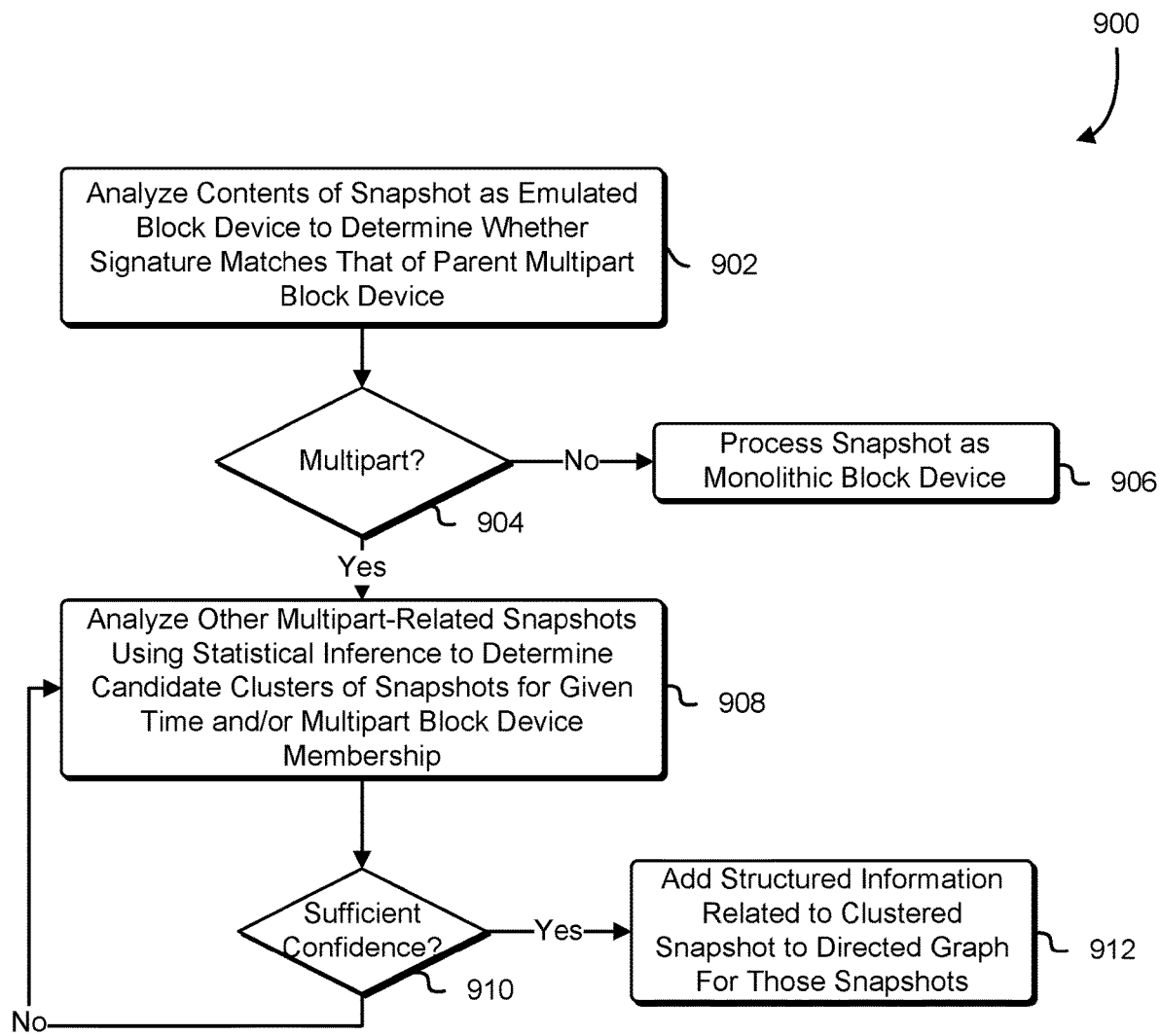
FIG. 9 illustrates an example workflow for determining whether individual snapshots belong to a snapshot associated with a multipart block device, in accordance with some embodiments.

FIG. 9 illustrates an example workflow for determining whether individual snapshots belong to a snapshot associated with a multipart block device, in accordance with some embodiments.

At step 902, a clustering analyzer analyzes contents of a snapshot, such as by accessing a snapshot block device emulated by a snapshot block device emulator, to determine whether any signatures within the block device (e.g., at specific locations/offsets within the snapshot block device) indicates that the snapshot being analyzed is associated with a constituent block device of a multipart block device.

At decision point 904, if the underlying block device for the snapshot is not determined as multipart, the snapshot is thereafter, at step 906, treated as a monolithic block device for analysis purposes. If at decision point 904 the block device is determined to be a constituent of a multipart block device, at step 908, the associated snapshot is added to a group of snapshots marked as associated with multipart block devices, and the group is subject to one or more types of clustering analysis by the clustering analyzer. As previously discussed, multiple algorithms and analysis types may be performed, according to one or more different criteria, and the results of the multiple analyses may be compared and combined so as to provide a meta-analysis that provides a higher level of clustering confidence than running only one algorithm or analysis type. The decision to perform one or multiple types of analyses may be made in connection with a specific level of cluster matching confidence required by the implementing system. To the extent that a minimum confidence or likelihood level is required by the implementing system, at decision point 910, if the minimum confidence is not met or exceeded, additional analyses are performed (e.g., step 908) until the confidence reaches a sufficient level. If the confidence is sufficient at decision point 910, then, at step 912, the clustering information is added as further structured information to the model for the associated snapshots, and further analysis is performed along the lines of the method described at least in connection with process 800 described above.

Figure 10:
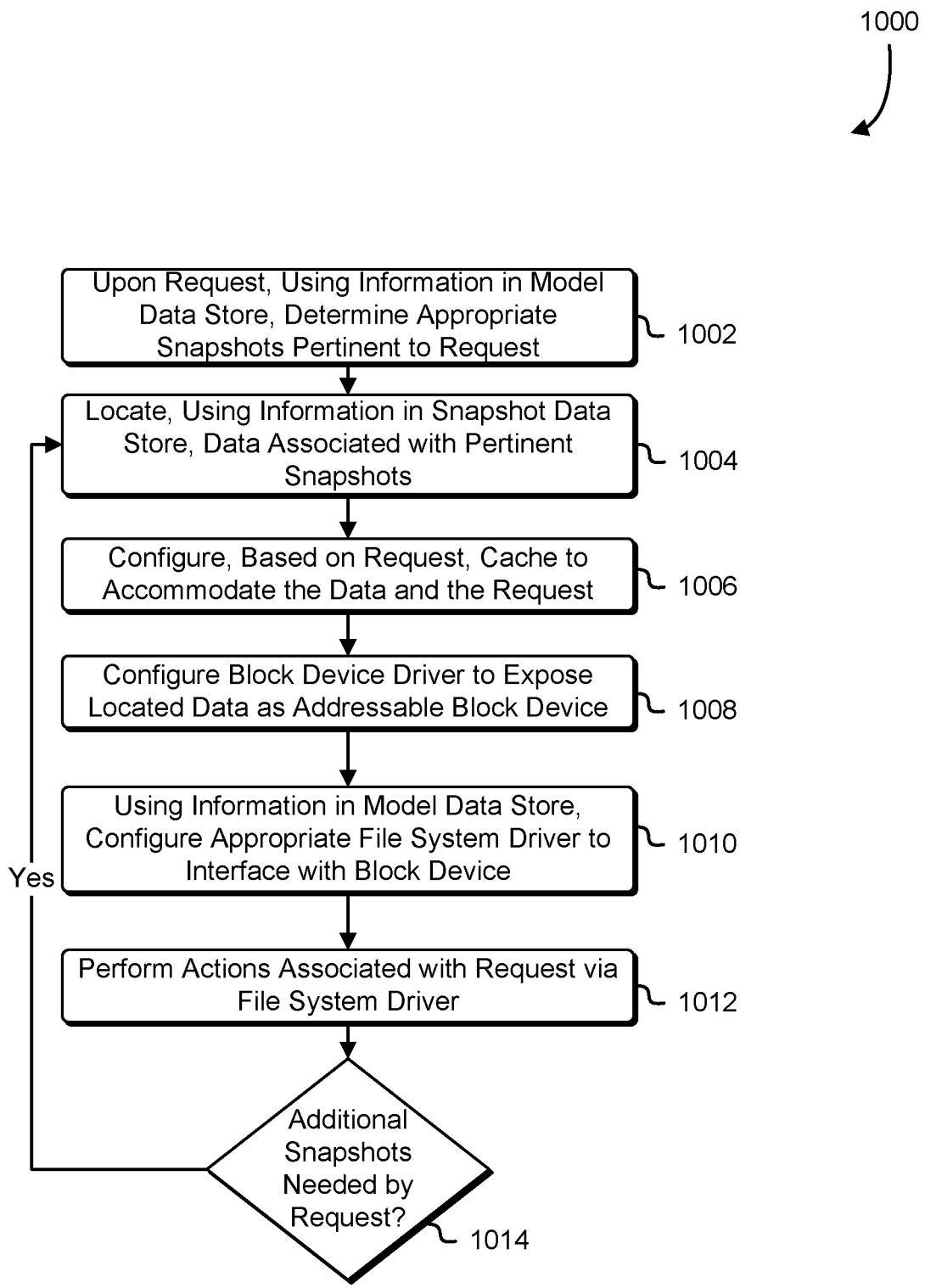
FIG. 10 illustrates an example workflow for emulating a block device for snapshot data stored in connection with a data storage system, in accordance with some embodiments.

FIG. 10 illustrates an example workflow for emulating a block device for snapshot data stored in connection with a data storage system, in accordance with some embodiments.

At step 1002, in connection with a data operation request to, e.g., a snapshot block device emulator and/or a file system analyzer, the snapshot block device emulator retrieves one or more models from the model data store and performs an analysis on the retrieved models to determine the snapshots necessary to fulfill the request.

At step 1004, the snapshots identified in step 1002 are located using, e.g., a query by the emulator to a snapshot data store, and the associated data chunks are retrieved. At step 1006, the emulator determines from the request (or, in some embodiments, predetermines based on a plurality of such requests or usage patterns for the emulator) an optimal cache size and configures the memory cache in accordance, and places at least some of the data necessary to fulfill the request within the memory cache as configured.

At step 1008, a block device driver, such as that provided by the Linux block layer, is provided to expose the located snapshot data, and to the extent it was placed in the cache at step 1006, block commands for such data is serviced from the cache. To the extent that data associated with the located snapshot is not cached, the incoming block device commands may be translated into retrieval commands for the cache, and, optionally, a portion of the cache is evicted to accommodate the newly retrieved data.

At step 1010, the emulator determines from an associated snapshot model an appropriate file system driver for the data contained therein, and applies the file system driver as a layer that interfaces with the exposed block device driver. High level operations associated with the incoming data operation request are performed at step 1012 via file system commands to the file system driver configured in step 1010.

To the extent that additional snapshots are required by the data operation request (e.g., to compare a range of files or other structures as between snapshot versions), at decision point 1014, the process iterates starting from step 1004 by locating additional snapshots and retrieving/processing data therewith.

Figure 11:
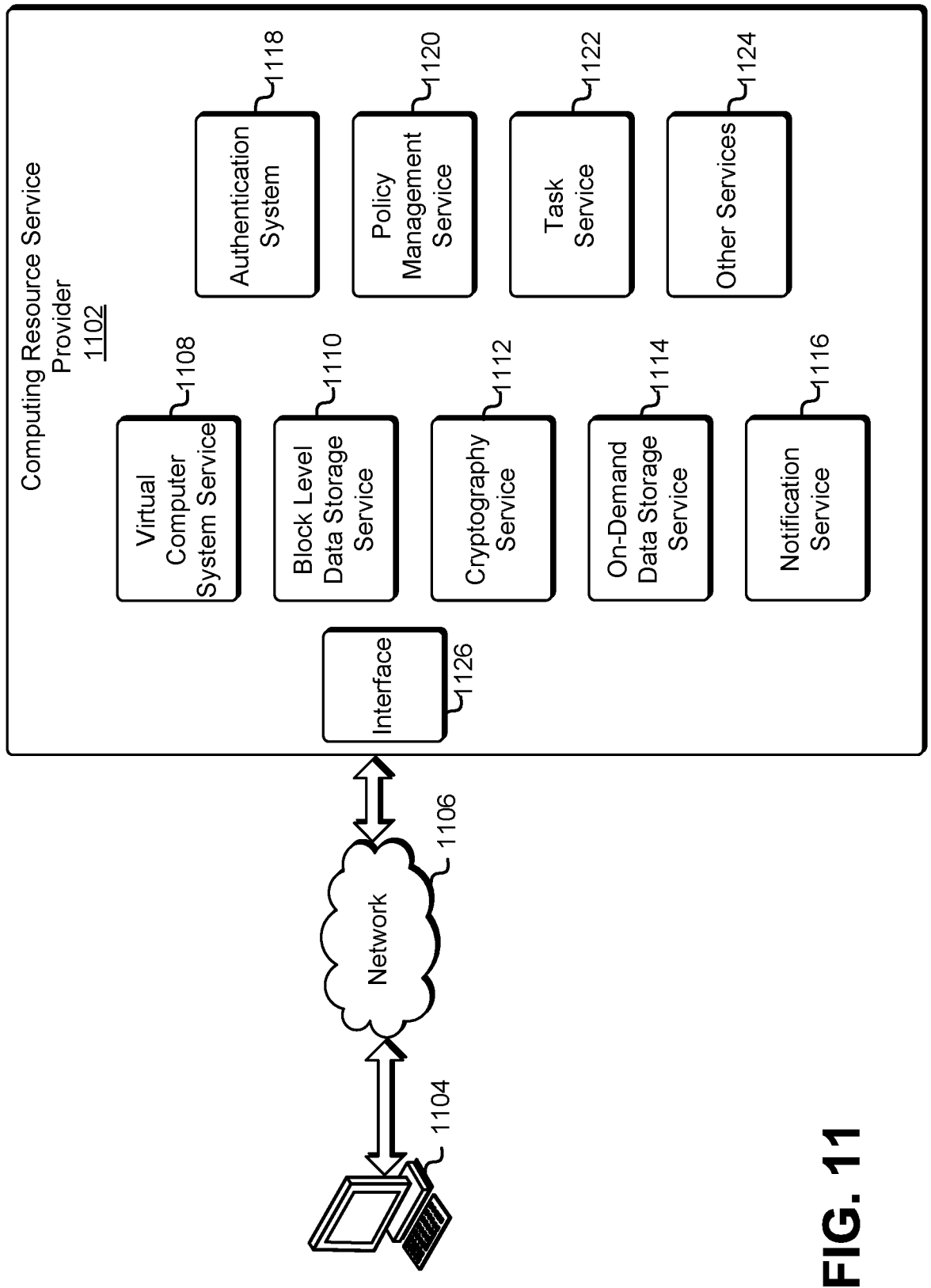
FIG. 11 shows an example of a customer connected to a computing resource service provider in accordance with at least one embodiment.

FIG. 11 shows an example of a customer connected to a computing resource service provider in accordance with at least one embodiment. The computing resource service provider 1102 may provide a variety of services to the customer 1104 and the customer 1104 may communicate with the computing resource service provider 1102 via an interface 1126, which may be a web services interface or any other type of customer interface. While FIG. 11 shows one interface 1126 for the services of the computing resource service provider 1102, each service may have its own interface and, generally, subsets of the services may have corresponding interfaces in addition to or as an alternative to the interface 1126. The customer 1104 may be an organization that may utilize one or more of the services provided by the computing resource service provider 1102 to maintain and deliver information to its employees, which may be located in various geographical locations. Additionally, the customer 1104 may be an individual that utilizes the services of the computing resource service provider 1102 to deliver content to a working group located remotely. As shown in FIG. 11, the customer 1104 may communicate with the computing resource service provider 1102 through a network 1106, whereby the network 1106 may be a communication network, such as the Internet, an intranet or an Internet service provider (ISP) network. Some communications from the customer 1104 to the computing resource service provider 1102 may cause the computing resource service provider 1102 to operate in accordance with one or more embodiments described or a variation thereof.

The computing resource service provider 1102 may provide various computing resource services to its customers. The services provided by the computing resource service provider 1102, in this example, include a virtual computer system service 1108, a block-level data storage service 1110, a cryptography service 1112, an on-demand data storage service 1114, a notification service 1116, an authentication system 1118, a policy management service 1120, a task service 1122 and one or more other services 1124. It is noted that not all embodiments described include the services 1108-24 described with reference to FIG. 11 and additional services may be provided in addition to or as an alternative to services explicitly described. As described, each of the services 1108-24 may include one or more web service interfaces that enable the customer 1104 to submit appropriately configured API calls to the various services through web service requests. In addition, each of the services may include one or more service interfaces that enable the services to access each other (e.g., to enable a virtual computer system of the virtual computer system service 1108 to store data in or retrieve data from the on-demand data storage service 1114 and/or to access one or more block-level data storage devices provided by the block level data storage service 1110).

The virtual computer system service 1108 may be a collection of computing resources configured to instantiate virtual machine instances on behalf of the customer 1104. The customer 1104 may interact with the virtual computer system service 1108 (via appropriately configured and authenticated API calls) to provision and operate virtual computer systems that are instantiated on physical computing devices hosted and operated by the computing resource service provider 1102. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 1108 is shown in FIG. 11, any other computer system or computer system service may be utilized in the computing resource service provider 1102, such as a computer system or computer system service that does not employ virtualization or instantiation and instead provisions computing resources on dedicated or shared computers/servers and/or other physical devices.

The block-level data storage service 1110 may comprise one or more computing resources that collectively operate to store data for a customer 1104 using block-level storage devices (and/or virtualizations thereof). The block-level storage devices of the block-level data storage service 1110 may, for instance, be operationally attached to virtual computer systems provided by the virtual computer system service 1108 to serve as logical units (e.g., virtual drives) for the computer systems. A block-level storage device may enable the persistent storage of data used/generated by a corresponding virtual computer system where the virtual computer system service 1108 may only provide ephemeral data storage.

The computing resource service provider 1102 also includes a cryptography service 1112. The cryptography service 1112 may utilize one or more storage services of the computing resource service provider 1102 to store keys of the customers in encrypted form, whereby the keys may be usable to decrypt the customer 1104 keys accessible only to particular devices of the cryptography service 1112.

The computing resource service provider 1102 further includes an on-demand data storage service 1114. The on-demand data storage service 1114 may be a collection of computing resources configured to synchronously process requests to store and/or access data. The on-demand data storage service 1114 may operate using computing resources (e.g., databases) that enable the on-demand data storage service 1114 to locate and retrieve data quickly, to allow data to be provided in responses to requests for the data. For example, the on-demand data storage service 1114 may maintain stored data in a manner such that, when a request for a data object is retrieved, the data object can be provided (or streaming of the data object can be initiated) in a response to the request. As noted, data stored in the on-demand data storage service 1114 may be organized into data objects. The data objects may have arbitrary sizes except, perhaps, for certain constraints on size. Thus, the on-demand data storage service 1114 may store numerous data objects of varying sizes. The on-demand data storage service 1114 may operate as a key value store that associates data objects with identifiers of the data objects which may be used by the customer 1104 to retrieve or perform other operations in connection with the data objects stored by the on-demand data storage service 1114.

In the environment illustrated in FIG. 11, a notification service 1116 is included. The notification service 1116 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1116 may provide notifications to clients using a "push" mechanism without the need to periodically check or "poll" for new information and updates. The notification service 1116 may further be used for various purposes such as monitoring applications executing in the virtual computer system service 1108, workflow systems, time-sensitive information updates, mobile applications, and many others.

As illustrated in FIG. 11, the computing resource service provider 1102, in various embodiments, includes an authentication system 1118 and a policy management service 1120. The authentication system 1118, in an embodiment, is a computer system (i.e., collection of computing resources) configured to perform operations involved in authentication of users of the customer. For instance, one of the services 1108-16 and 1120-24 may provide information from a user to the authentication system 1118 to receive information in return that indicates whether the user requests are authentic.

The policy management service 1120, in an embodiment, is a computer system configured to manage policies on behalf of customers (such as customer 1104) of the computing resource service provider 1102. The policy management service 1120 may include an interface that enables customers to submit requests related to the management of policy. Such requests may be, for instance, requests to add, delete, change, or otherwise modify policy for a customer or for other administrative actions, such as providing an inventory of existing policies and the like.

The computing resource service provider 1102, in various embodiments, is also equipped with a task service 1122. The task service 1122 is configured to receive a task package from the customer 1104 and enable executing tasks as dictated by the task package. The task service 1122 may be configured to use any resource of the computing resource service provider 1102, such as one or more instantiated virtual machines or virtual hosts, for executing the task. The task service 1122 may configure the one or more instantiated virtual machines or virtual hosts to operate using a selected operating system and/or a selected execution application in accordance with a requirement of the customer 1104.

The computing resource service provider 1102 additionally maintains one or more other services 1124 based at least in part on the needs of its customers 1104. For instance, the computing resource service provider 1102 may maintain a database service for its customers 1104. A database service may be a collection of computing resources that collectively operate to run one or more databases for one or more customers 1104. The customer 1104 may operate and manage a database from the database service by utilizing appropriately configured API calls. This, in turn, may allow a customer 1104 to maintain and potentially scale the operations in the database. Other services include, but are not limited to, object-level archival data storage services, services that manage and/or monitor other services.

Figure 12:
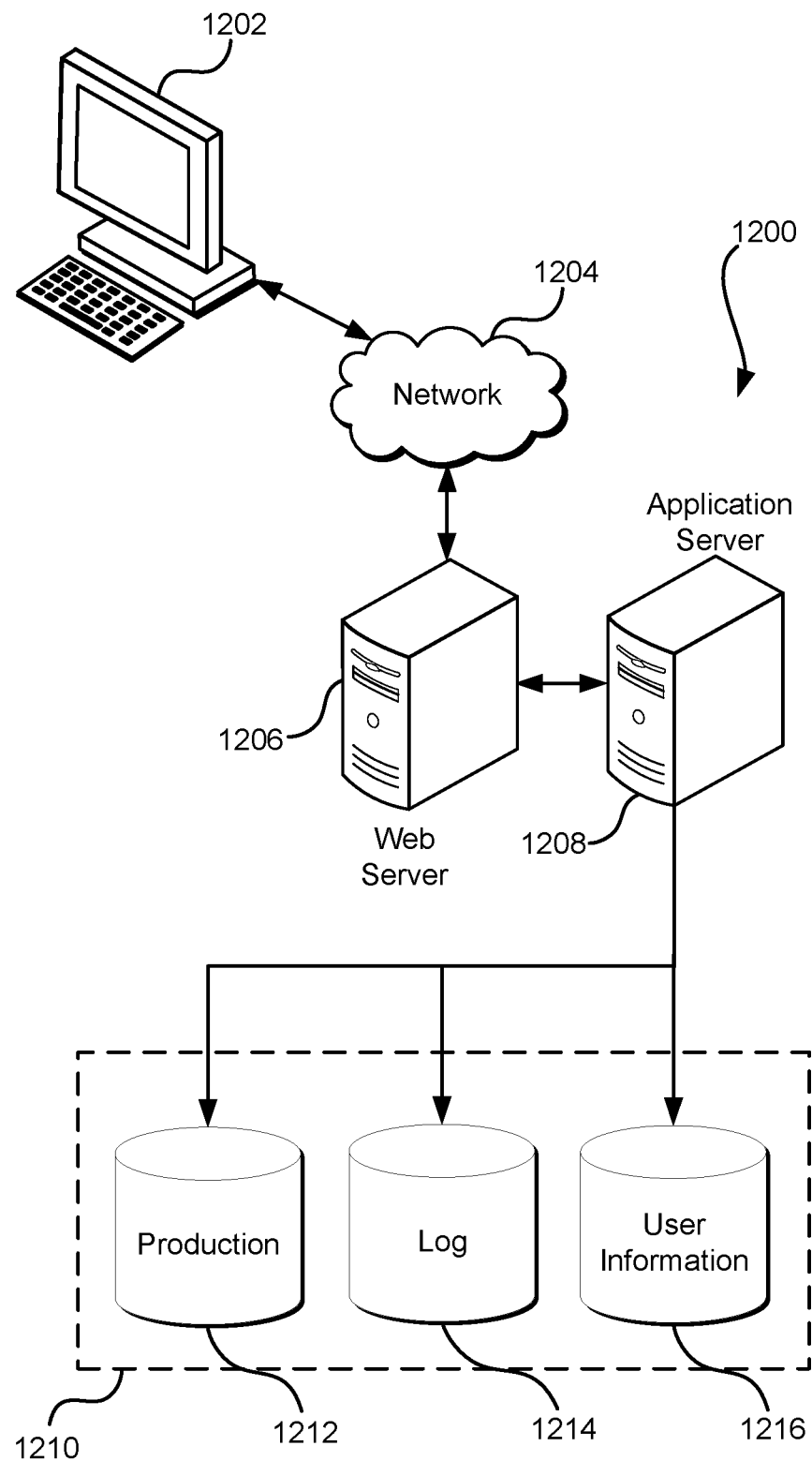
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   in response to a request to perform a file retrieval command involving a snapshot, the snapshot reflecting a state, at a point in time specified in the snapshot, of data contents stored in a block device allocated by a data storage system, at least:
   retrieving snapshot data associated with the snapshot and reflecting the state of the data contents at the point in time specified in the snapshot;
   storing at least a subset of the snapshot data in a memory cache;
   configuring a block device driver to expose the snapshot data as an addressable snapshot block device;
   retrieving, from a model data store, a snapshot model associated with the snapshot, the snapshot model indicating at least one file system in the snapshot;
   determining, based at least in part on analyzing the snapshot model, that the addressable snapshot block device is a constituent of a multipart block device;
   configuring a file system driver capable of interfacing with the at least one file system to expose the multipart block device as an addressable snapshot file system in accordance with the indicated file system; and
   performing the file retrieval command on the addressable snapshot file system.

2. The computer-implemented method of claim 1, further comprising:
   analyzing the file retrieval command to determine at least an appropriate size for the memory cache; and
   configuring the memory cache to the appropriate size.

3. The computer-implemented method of claim 1, wherein the file retrieval command in the request involves a second snapshot as well as the snapshot.

4. The computer-implemented method of claim 1, wherein the snapshot model includes a hierarchy of data structures in the snapshot, the hierarchy of data structures including the file system.

5. A system, comprising:
   one or more computer processors; and
   memory storing executable instructions that, as a result of being executed by the one or more computer processors, cause the system to:
   provide access to snapshot data, the snapshot data reflecting a state of data of a block device at a point in time at which an associated snapshot of the block device was taken, by at least:
   receiving, using a file system interface, a request for snapshot data;
   generating a snapshot model associated with the snapshot data, the snapshot model indicating a file system in the snapshot data;
   determining, based at least in part on analyzing the snapshot model, that the block device is a constituent block device of a multipart block device;
   translating, in accordance with the file system in the snapshot data, based at least in part on the multipart block device, the request for snapshot data into requests to retrieve snapshot data related to the request, via an interface associated with a data storage system on which the snapshot data are stored;
   analyzing the request to determine which snapshot data to retrieve;
   retrieving the snapshot data from the data storage system; and
   providing the snapshot data as retrieved via the snapshot file system interface.

6. The system of claim 5, wherein the executable instructions further cause the system to:
   place at least a subset of the snapshot data into a memory cache; and
   provide the subset of the snapshot data from the memory cache.

7. The system of claim 5, wherein the request is associated with a file system command involving multiple sets of snapshot data.

8. The system of claim 7, wherein the executable instructions further cause the system to configure a memory cache in connection with the request.

9. The system of claim 5, wherein the executable instructions further cause the system to:
   determine a file system in the snapshot data;
   configure a file system driver to translate between block device commands associated with the block device and file system commands; and
   provide the snapshot data via the file system driver.

10. The system of claim 9, wherein the file system is determined from a model of a snapshot associated with the snapshot data.

11. The system of claim 10, wherein the model is stored in a model data store of the system.

12. The system of claim 5, wherein the request is a web service call.

13. A non-transitory computer-readable storage medium comprising stored thereon executable instructions that, as a result of being executed by one or more processors of a computer system, cause the computer system to at least:
- emulate a file system device for data in a snapshot, the snapshot including a point in time copy of at least a portion of contents of a block device, by at least:
  - retrieving a portion of the data in the snapshot from a data store in communication with the computer system;
  - storing the portion of the data in a memory cache;
  - generating a snapshot model associated with the snapshot;
  - forming an updated snapshot model associated with the snapshot, based at least in part on determining the snapshot includes a constituent block device of a multipart block device, the updated snapshot model indicating a file system in the snapshot;
  - providing a file system interface with the multipart block device in accordance with the file system indicated by the updated snapshot model;
  - for a first file system command for a first set of snapshot data in the snapshot within the portion of the data in the memory cache, providing the first set of snapshot data from the memory cache as requested; and
  - for a second file system command for a second set of snapshot data in the snapshot and outside of the portion of the data in the memory cache, at least:
    - retrieving the second set of snapshot data from the data store; and
    - providing the second set of snapshot data as retrieved.

14. The non-transitory computer-readable storage medium of claim 13, wherein the instructions further comprise instructions that, as a result of being executed by the one or more processors, cause the computer system to:
- retrieve a model associated with the snapshot;
- determine, from the model, the file system associated with the data in the snapshot;
- configure a file system driver in accordance with the file system to translate file system commands into block device commands; and
- in response to file system commands associated with a data operation, use the file system driver to translate the file system commands into block device commands.

15. The non-transitory computer-readable storage medium of claim 14, wherein the file system device is accessible to the computer system over a network.

16. The non-transitory computer-readable storage medium of claim 13, wherein the data store is implemented on a separate data storage system from that of the computer system.

17. The non-transitory computer-readable storage medium of claim 13, wherein the instructions further comprise instructions that, as a result of being executed by the one or more processors, cause the computer system to adjust size of the memory cache in accordance with operational parameters for the file system device.

18. The non-transitory computer-readable storage medium of claim 17, wherein the operational parameters are determined from a data operation request associated with the file system device.

19. The non-transitory computer-readable storage medium of claim 13, wherein the instructions further comprise instructions that, as a result of being executed by the one or more processors, cause the computer system to emulate the file system device for the data in a multipart snapshot that includes a plurality of parts, each part being a snapshot and being associated with a different part of the multipart block device.

20. The non-transitory computer-readable storage medium of claim 13, wherein the updated snapshot model is formed using machine learning.

* * * * *